(12) United States Patent
Staton

(10) Patent No.: US 9,951,835 B2
(45) Date of Patent: Apr. 24, 2018

(54) WINDOW SYSTEM

(71) Applicant: Fielding B. Staton, Liberty, MO (US)

(72) Inventor: Fielding B. Staton, Liberty, MO (US)

(73) Assignee: Newtonoid Technologies, L.L.C., Liberty, MO (US)

( * ) Notice: Subject to any disclaimer, the term of this patent is extended or adjusted under 35 U.S.C. 154(b) by 241 days.

(21) Appl. No.: 14/807,331

(22) Filed: Jul. 23, 2015

(65) Prior Publication Data
US 2015/0330138 A1     Nov. 19, 2015

Related U.S. Application Data

(63) Continuation-in-part of application No. 14/528,099, filed on Oct. 30, 2014, now Pat. No. 9,476,478, which is a continuation-in-part of application No. 14/310,899, filed on Jun. 20, 2014, now Pat. No. 8,899,562, which is a continuation-in-part of application No. 14/188,303, filed on Feb. 24, 2014, now Pat. No. 8,789,818, which is a continuation-in-part of application No. 13/796,170, filed on Mar. 12, 2013, now Pat. No. 8,695,955.

(60) Provisional application No. 62/928,687, filed on Jan. 17, 2014, provisional application No. 61/988,024, filed on May 2, 2014.

(51) Int. Cl.
| | |
|---|---|
| *B60R 25/10* | (2013.01) |
| *F16F 1/04* | (2006.01) |
| *H05B 3/84* | (2006.01) |
| *E06B 3/68* | (2006.01) |
| *E06B 5/11* | (2006.01) |
| *E06B 5/12* | (2006.01) |

(52) U.S. Cl.
CPC ............... *F16F 1/04* (2013.01); *E06B 3/68* (2013.01); *H05B 3/84* (2013.01); *E06B 5/11* (2013.01); *E06B 5/12* (2013.01)

(58) Field of Classification Search
CPC ........ F16F 13/00; F16F 13/005; F16F 13/002; F16F 13/04; F16F 1/04; F16F 15/005; F41C 23/06; E06B 33/68; E06B 5/11; E06B 5/12; H05B 3/84; A42B 3/063; A42B 3/0453; A42B 3/046; A42B 3/125; A42B 3/20; G08B 21/02; B60J 1/006; B60J 1/2094; B60R 1/04
USPC ....... 267/89, 195, 204, 216, 104.13, 140.14, 267/140.15; 2/6.8, 411, 412, 414, 416; 340/426.27, 511, 545.1, 545.9; 353/28, 353/79, 80
See application file for complete search history.

(56) References Cited

U.S. PATENT DOCUMENTS

| | | |
|---|---|---|
| 1,383,582 A | 7/1921 | Stubbs |
| 2,950,576 A | 8/1960 | Rubenstein |
| 3,467,973 A | 9/1969 | Minnick |

(Continued)

OTHER PUBLICATIONS

U.S. Appl. No. 14/528,099, Non-Final Office Action dated May 5, 2016, 24 pages.

(Continued)

*Primary Examiner* — William V Gilbert
(74) *Attorney, Agent, or Firm* — Lathrop Gage L.L.P.

(57) ABSTRACT

A window system is disclosed. The window system includes a window which has a first window pane spatially separated from a second window pane. The window panes are surrounded by a window frame, which houses a memory device for storing electronic data.

17 Claims, 35 Drawing Sheets

(56) References Cited

U.S. PATENT DOCUMENTS

| | | | |
|---|---|---|---|
| 3,783,568 A | | 1/1974 | Adler et al. |
| 4,350,978 A * | | 9/1982 | Riccobono ............. G08B 13/20 |
| | | | 340/550 |
| 5,348,363 A | | 9/1994 | Fink |
| 7,241,017 B2 * | | 7/2007 | Ariyoshi ................ G03B 21/10 |
| | | | 248/922 |
| 7,426,804 B2 * | | 9/2008 | Pylkki ....................... E06B 7/28 |
| | | | 348/E5.13 |
| 7,461,726 B2 | | 12/2008 | Hawkins et al. |
| 8,303,027 B2 | | 11/2012 | Murakami et al. |
| 9,341,527 B2 | | 5/2016 | O'Bier, II et al. |
| 2004/0012502 A1 * | | 1/2004 | Rasmussen ............ G08B 13/04 |
| | | | 340/870.16 |
| 2004/0232240 A1 * | | 11/2004 | O'Keeffe ............... G09G 3/002 |
| | | | 235/462.14 |
| 2010/0214634 A1 * | | 8/2010 | Kroll ...................... G02B 5/045 |
| | | | 359/9 |
| 2012/0098941 A1 * | | 4/2012 | Joseph ............... G02B 27/2221 |
| | | | 348/51 |

OTHER PUBLICATIONS

U.S. Appl. No. 15/352,419, Non-Final Office Action dated Apr. 25, 2017, 15 pages.

U.S. Appl. No. 14/528,099, Notice of Allowance dated Jun. 23, 2016, 5 pages.

U.S. Appl. No. 15/352,419, Final Office Action dated Aug. 23, 2017, 18 pages.

\* cited by examiner

WINDOW SYSTEM

CROSS-REFERENCE TO RELATED APPLICATIONS

This application is a continuation-in-part of U.S. patent application Ser. No. 14/528,099, filed Oct. 30, 2014, which claims priority to U.S. Provisional Patent Application No. 62/928,687, filed Jan. 17, 2014 and is also a continuation-in-part of U.S. patent application Ser. No. 14/310,899, filed Jun. 20, 2014, now U.S. Pat. No. 8,899,562, issued Oct. 2, 2014; which claims priority to U.S. Provisional Patent Application No. 61/988,024, filed May 2, 2014 and is also a continuation-in-part of U.S. patent application Ser. No. 14/188,303, filed Feb. 24, 2014, now U.S. Pat. No. 8,789,818, issued Sep. 29, 2014, which is a continuation-in-part of U.S. patent application Ser. No. 13/796,170, filed Mar. 12, 2013, now U.S. Pat. No. 8,695,955, issued Apr. 15, 2014. All of the aforementioned are incorporated herein by reference in their entireties.

BACKGROUND

Impact forces received upon particular materials may compromise the integrity of the material and the purpose for which it is used. For example, glass is an amorphous solid material that is used extensively in everyday life. However, glass products such as automobile windshields and home windows are particularly prone to encounter debris that may result in some degree of cracking, chipping, or even shattering (collectively "breakage"). Rocks are often encountered by automobile tires and projected at following traffic, and lawn mowers may similarly propel debris at windows (and especially those that are adjacent the ground). While manufacturing advancements have been made to improve the resilience of glass products, such improved products may be undesirably expensive and may nevertheless still be susceptible to breakage. Further, those manufacturing advancements do not aid existing products that were made with older technology.

Some embodiments set forth herein may inhibit glass breakage without requiring any changes to how the glass is manufactured. Other embodiments set forth herein may be incorporated in the glass manufacturing process as an alternative, or enhancement, to other anti-breakage technologies. Still other embodiments set forth herein may provide electronic means for monitoring activity around a window or the surrounding area or customizing windows.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

In one embodiment, an apparatus for inhibiting glass breakage includes a housing, a contact member, and a biasing member. The housing has a contact end with an aperture, and the contact member is disposed at least primarily inside the housing. The biasing member biases the contact member toward the housing aperture. Means for fixing the housing contact end to a glass surface are further included.

In another embodiment, a method for inhibiting glass breakage begins with obtaining an apparatus having: (a) a housing having a contact end with an aperture; (b) a contact member disposed at least primarily inside the housing; and (c) a biasing member biasing the contact member toward the housing aperture. The housing contact end is then adhered to a glass item, and impact force is transferred from the glass item to the biasing member via the contact member.

In still another embodiment, a glass product includes a sheet of glass and an apparatus for inhibiting glass breakage. The apparatus for inhibiting glass breakage includes: (a) a housing having a contact end with an aperture; (b) a contact member disposed at least primarily inside the housing; and (c) a biasing member biasing the contact member toward the housing aperture. The housing contact end is coupled to the sheet of glass, and the contact member rests upon the sheet of glass for receiving an impact force from the sheet of glass.

In yet another embodiment, a glass product includes a first sheet of glass, a second sheet of glass laminated to the first sheet of glass, and an apparatus for inhibiting glass breakage. The second sheet of glass has an opening therein, and the apparatus for inhibiting glass breakage includes: (a) a housing having a contact end with a first aperture; (b) a first contact member disposed at least primarily inside the housing; and (c) a biasing member biasing the first contact member toward the first aperture. The housing contact end is coupled to at least one of the first sheet of glass and the second sheet of glass, and the contact member passes through the opening in the second sheet of glass and rests upon the first sheet of glass for receiving an impact force from the first sheet of glass.

In another embodiment, an apparatus for dispersing impact forces includes a housing having a contact end with an aperture; a contact member located at least primarily inside the housing; a biasing member biasing the contact member toward the housing aperture; and means for securing the housing contact end to a surface. When an impact force is received upon the impact receiving surface, the force is at least partially transferred to the contact member, which in turn temporarily alters the biasing member, which subsequently returns the contact member to an initial position. The return of the contact member imparts a second force on the impact receiving surface, which is less than the impact force transferred to the contact member.

In still another embodiment an apparatus for dispersing impact forces is provided, which includes a base, a rail, a contact member for contacting an impact receiving surface, a first biasing member located between the base and the rail, and a second biasing member located between the rail and the contact member. The first biasing member biases the rail toward a rest position and the second biasing member biases the contact member toward an initial position at the impact receiving surface. An impact force received on the impact receiving surface is at least partially transferred to the contact member, which temporarily alters the second biasing member. The contact member is subsequently returned to the initial position, which imparts a second force on the impact receiving surface.

In still yet another embodiment, an apparatus for dispersing impact forces includes a base, a contact member for contacting an impact receiving surface, and a primary biasing member disposed between the base and the contact member. The primary biasing member biases the contact member toward an initial position at the impact receiving surface. An impact force received on the impact receiving surface is at least partially transferred to the contact member, which in turn temporarily alters the primary biasing member which subsequently returns the contact member to the initial position. The return of the contact member to the initial position imparts a second force on the impact receiving surface.

In still a further embodiment, a window product includes a first window pane, a second window pane, and an apparatus for dispersing impact forces. The apparatus for dispersing impact forces has a base, a contact member for contacting the first window pane, and a primary biasing member disposed between the base and the contact member. The primary biasing member biases the contact member toward an initial position at the first window pane. An impact force received on the first window pane is at least partially transferred to the contact member, which in turn temporarily alters the primary biasing member which subsequently returns the contact member to the initial position. The return of the contact member to the initial position imparts a second force on the first window pane.

In still another embodiment, an apparatus for dispersing impact forces is provided which includes a housing having a contact end with an aperture; a contact member located at least primarily inside the housing; a biasing member biasing the contact member toward the housing aperture; and a sensor. The housing contact end is secured to an impact receiving surface. The sensor initiates an alert when an impact force received on the impact receiving surface causes the contact member to shift a predetermined distance from an initial position.

Provided in still yet another embodiment is an apparatus for dispersing impact forces having a base; a contact member for contacting an impact receiving surface; a biasing member disposed between the base and the contact member; and a sensor. The biasing member biases the contact member toward an initial position at the impact receiving surface; and the sensor initiates an alert when an impact force received on the impact receiving surface causes the contact member to shift from an initial position.

In yet another embodiment, a window product includes a window pane and an apparatus for dispersing impact forces. The apparatus for dispersing impact forces has a base; a contact member positioned to receive force from the window pane; a biasing member disposed between the base and the contact member; and a sensor. The biasing member biases the contact member toward an initial position at the window pane. An impact force received on the window pane cause the contact member and the biasing member to move. The movement of the contact member or the biasing member activates the sensor, causing the sensor to initiate an alert.

In still a further embodiment is provided a monitoring system having an input device, an alarm, a processor, and electronic instructions. The input device includes a housing having a contact end with an aperture; a contact member located at least primarily inside the housing; a biasing member biasing the contact member toward the housing aperture; at least one sensor; and means for securing the housing contact end to an impact receiving surface. The processor is in data communication with the sensor, and the electronic instructions, when executed by the processor, performs steps for (a) receiving at least one signal from the sensor; (b) analyzing the at least one signal to identify a triggering event; and (c) upon identifying a triggering event, actuating the alarm.

In another embodiment of the present invention a system for mitigating an impact force is disclosed. The system includes a device having a first layer, a second layer, and an intervening member. The intervening member is suspended between the first and second layers via a first biasing member. A first portion of a force initially received by the first layer is transferred to the intervening member; a fraction of the force transferred to the intervening member is returned to the first layer, the fraction returned to the first layer being less than the force received by the first layer; and a second portion of the force initially received by the first layer is partially transferred to the second layer, the second portion being less than the initial force received by the first layer.

In still another embodiment, a window system is disclosed. The system includes a window that has a first pane which is spatially separated from a second pane. The panes are surrounded by a window frame. The system further includes at least two muntin bars, and each muntin bar has a receiving end and an attachment end. The system may also include a first insert having at least two legs extending therefrom, and the insert includes an insert device comprising an apparatus for dispersing impact forces. A first leg of the insert is received into the receiving end of a first muntin bar and a second leg of the insert is received into the receiving end of a second muntin bar, thereby attaching the first and second muntin bars. Finally, the attachment ends of the first and second muntin bars are secured to the window frame.

In still yet another embodiment, a window monitoring system has a window with a first pane spatially separated from a second pane, the panes being surrounded by a window frame; a plurality of muntin bars, each muntin bar having a receiving end and an attachment end; and at least one device incorporated into an insert having at least two legs extending therefrom. The legs of the insert are received by the receiving ends of the at least two muntin bars, and the attachment ends of the legs are attached to the window frame between the first and second window frames.

The at least one device is selected from the group consisting of: a) an apparatus for dispersing impact forces, b) a camera, c) a video recording device, d) a motion sensor, e) a temperature sensor, and f) an earthquake sensor. The system further include wiring to attach the plurality of insert devices to a power source, and a memory device for storing information received from the plurality of insert devises.

The apparatus for dispersing impact devices includes a first contact member for contacting the first window pane; a second contact member for contacting the second window pane; and a biasing member for biasing the first and second contact members towards the respective window pane. The biasing member biases the contact members toward an initial position at the respective window panes; and an impact force received on at least one window pane is at least partially transferred to the biasing member, thereby moving the contact members from a respective initial position, the biasing member subsequently returning the contact members to their respective initial positions, whereby the return of the contact members to the respective initial positions impacts a second force on the first window pane.

In still a further embodiment, a window system includes a window having a first window pane spatially separated from a second window pane, the window panes being surrounded by a window frame; and a memory device housed in the window frame for storing electronic data.

DETAILED DESCRIPTION

Figure 1:
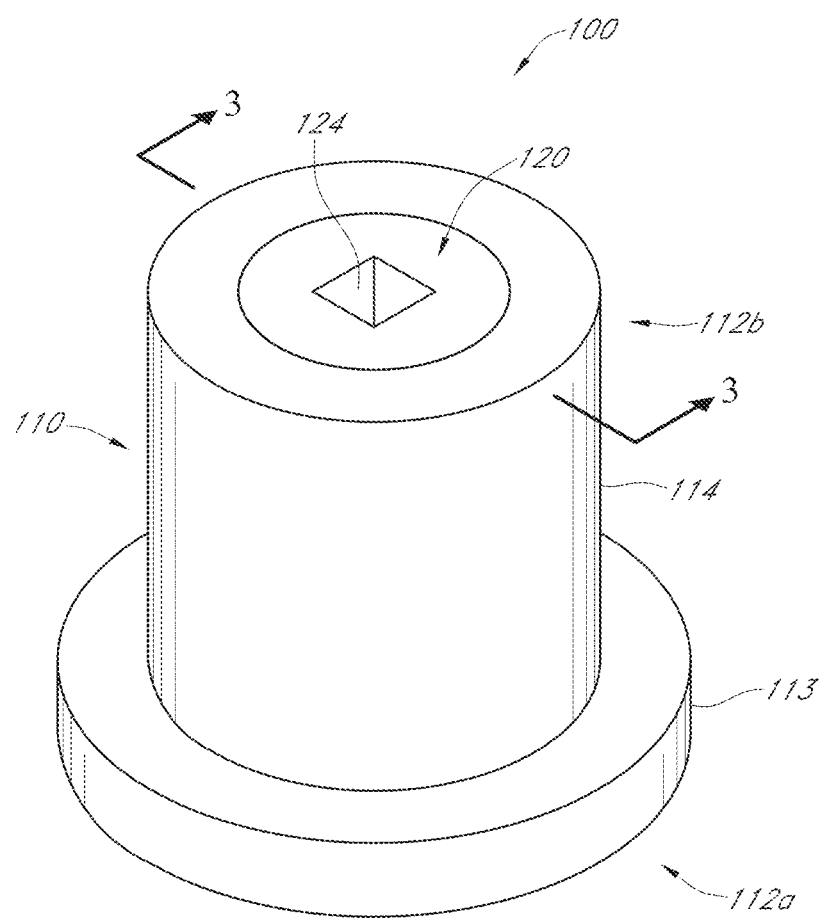
FIG. 1 is a perspective view showing an apparatus for inhibiting glass breakage according to one embodiment of the current invention, with a distal end of the apparatus visible.

FIGS. 1 through 4 show an apparatus for inhibiting glass breakage according to one embodiment 100 of the current invention. The apparatus 100 broadly includes a housing 110, a contact member 130, and a biasing member 140.

Figure 2:
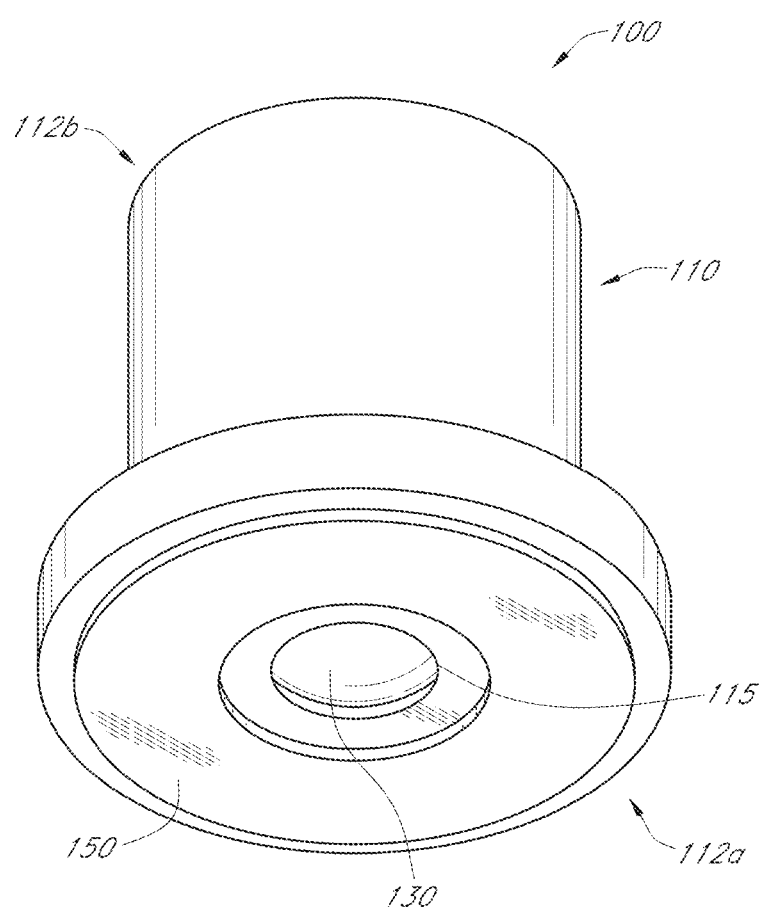
FIG. 2 is a perspective view of the apparatus of FIG. 1, with a proximal (or "contact") end of the apparatus visible.
Figure 3:
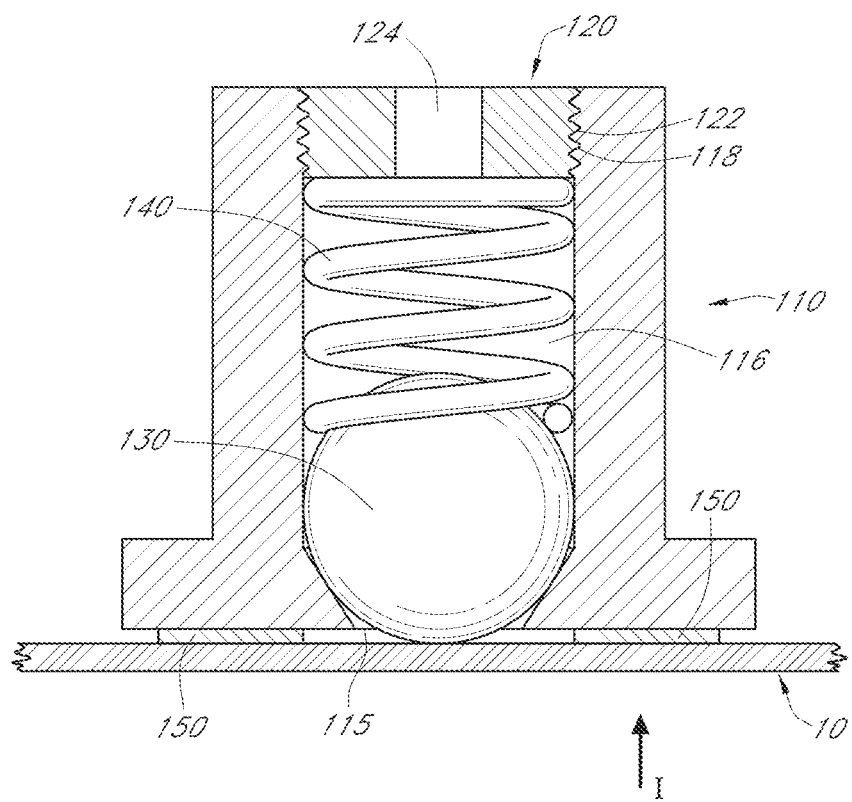
FIG. 3 is a side view of the apparatus of FIG. 1 in use, with various elements shown in section taken along line 3-3 in FIG. 1.
Figure 4:
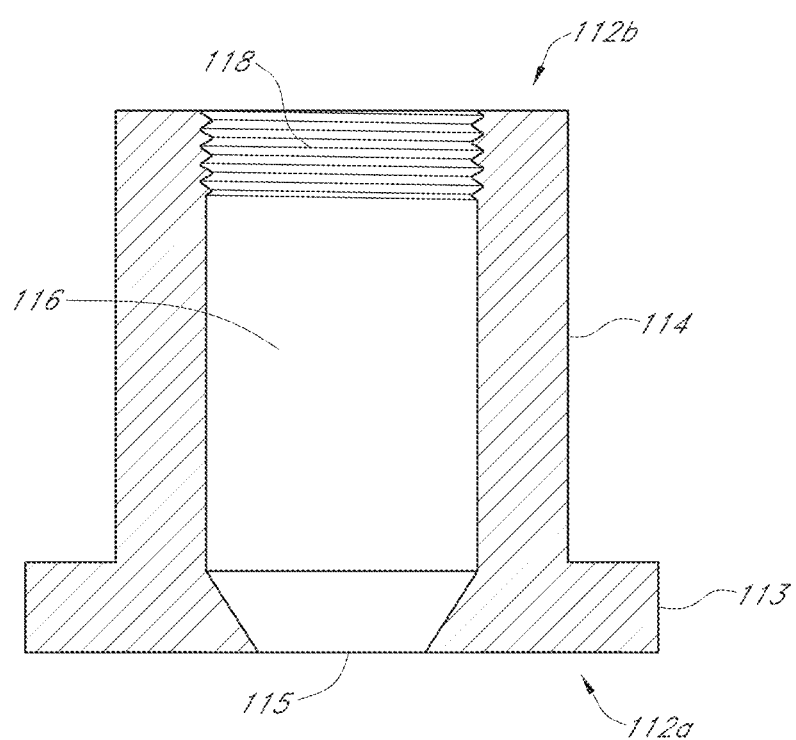
FIG. 4 is a section view of the housing of FIG. 3.

The housing 110 has a contact end 112a opposite a distal end 112b, and the contact end 112a has an aperture 115 (FIGS. 2 through 4). While the housing 110 may be configured in various ways, it may be desirable for the contact end 112a to have a surface area that is greater than a surface area of the distal end 112b. Such increased surface area at the contact end 112a may allow the housing 110 to be better coupled to a glass surface (as discussed further below) while minimizing the size of the housing 110 at the distal end 112b. The housing 110 is shown to have a first portion 113 extending from the contact end 112a and a second portion 114 extending from the distal end 112b, with each portion 113, 114 being generally cylindrical and extending to one another. While such configuration is currently preferred in the embodiment 100, other geometries (conical, rectangular, octagonal, irregular geometries, more or fewer portions, et cetera) may nevertheless be used.

The housing 110 may be constructed of plastic, metal, composites, and/or any other appropriate material. Moreover, various manufacturing processes may be used to form the housing, such as molding, casting, machining, and/or 3-D printing. While in some embodiments the housing 110 is formed as a unitary element, in other embodiments it may be multiple elements coupled together. For example, the first portion 113 may be fastened to the second portion 114 after each portion 113, 114 is formed.

The contact member 130 (FIGS. 2 and 3) is disposed at least primarily inside the housing 110, and specifically in a cavity 116 defined by the housing 110, and the biasing member 140 (FIG. 3) is similarly disposed in the cavity 116 and biases the contact member 130 toward the housing aperture 115. In the embodiment 100, the aperture 115 is round and smaller than the contact member 130 such that the contact member 130 cannot completely pass through the aperture 115.

As shown in FIG. 3, it may be desirable for the contact member 130 to be generally spherical to provide a single point of contact between the contact member 130 and a sheet of glass 10 with which the apparatus 100 will be used. In addition, a spherical configuration may allow the contact member 130 to be easily seated in the housing 110 at the aperture 115. Nevertheless, the contact member 130 may be configured to be shaped differently and the aperture 115 may be shaped complementary to the configuration of the contact member 130.

The contact member 130 may be constructed of entirely non-elastic material (e.g., metal). However, it may be desirable for the contact member 130 to be made at least partially of a resilient material such as rubber, or other materials such as glass. A rubberized coating on a non-elastic material may be particularly suitable, allowing some energy to be absorbed upon impact of the glass 10 and the contact member 130 yet transferring most of an impact force from the glass 10 to the biasing member 140.

The biasing member 140 in the embodiment 100 is a helical spring, as shown in FIG. 3. Other types of resilient members may alternately (or additionally) be used in different embodiments, such as a flat spring, a gas spring, a hydraulic spring, or a magnetic spring. An endcap 120 is coupled to the housing 110 to prevent the contact member 130 from exiting the housing 110, and the biasing member 140 may abut the endcap 120, as shown in FIG. 3. The housing 110 includes threading 118 (FIGS. 3 and 4), and the endcap 120 includes complementary threading 122 for coupling the endcap 120 to the housing 110. The endcap 120 may further include a passage or other element 124 for receiving a driver bit, allowing the endcap 120 to be fastened to the housing 110. While other embodiments may use fastening methods besides threading (for example, adhesive or fusing), it may be desirable for the endcap 120 to be adjustably coupled to the housing 110; such adjustment may allow an amount of force on the contact member 130 provided by the biasing member 140 to be altered as desired.

Various means may be included for fastening the housing contact end 112a to the glass 10 (which may or may not be generally planar). As shown in FIGS. 2 and 3, adhesive 150 may be used to couple the contact end 112a to the glass 10. Especially if the housing contact end 112a is generally flat or otherwise not of the same curvature as the glass 10, the adhesive 150 may be particularly desirable to fill the area between the contact end 112a and the glass 10 and provide a strong bond. Nevertheless, other embodiments may use magnetic fasteners, fusing processes, and other suitable fastening technology.

In use, the apparatus 100 is adhered to (or otherwise coupled to) the glass 10, as shown for example in FIG. 3. The biasing member 140 biases the contact member 130 toward the aperture 115, and the contact member 130 extends through the aperture 115 and contacts the glass 10. The system may remain in this configuration until the glass 10 receives an impact force I. For example, the glass 10 may be a windshield or a residential window, and flying debris may provide the impact force I. Upon receipt of the impact force I, the glass 10 may transfer at least a portion of the impact force I to the contact member 130, which in turn may move from the contact end 112a and transfer force to the biasing member 140. The biasing member 140 may then return to its prior configuration, moving the contact member 140 back through the aperture 115 and contacting the glass 10.

Inefficiencies in the biasing member 140, for example, may cause less than the full amount of force transferred to the contact member 130 from the glass 10 to be returned to the glass 10. This may be particularly advantageous if multiple apparatus 100 are used with the glass 10. In addition, if multiple apparatus 100 are used with the glass 10, the timing of the force transfer may vary slightly between the different apparatus 100, allowing forces to be transferred back to the glass 10 at different times. The glass 10 may be able to withstand this staggered return of forces better than the impact force I if the multiple apparatus 100 were not utilized.

Figure 5:
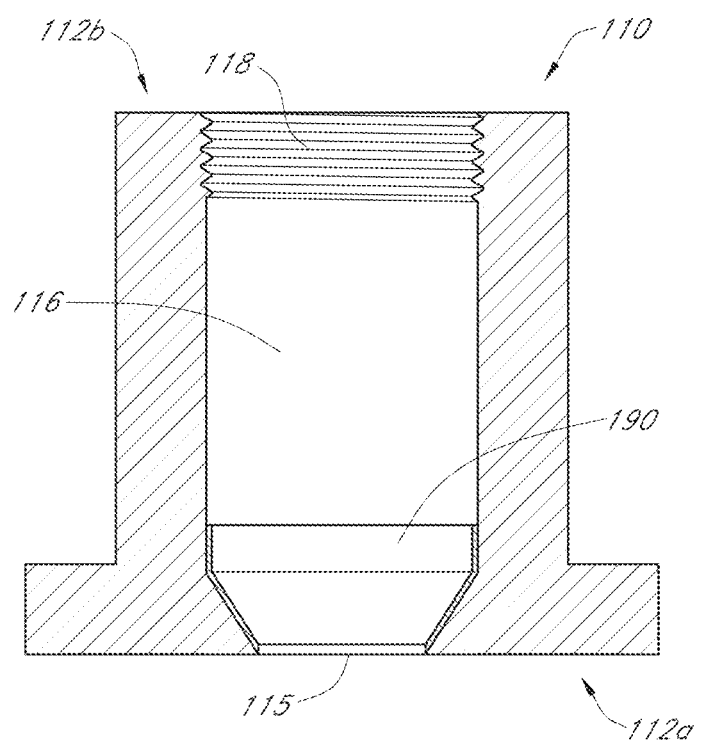
FIG. 5 is a section view showing a cushion member added inside the housing of FIG. 4.

To further dissipate the impact force I, a cushion 190 may be placed in the housing 110, as shown in FIG. 5. In such embodiments, the cushion 190 may be initially compressed when the contact member 130 contacts the glass 10. Upon movement of the contact member 130 away from the aperture 115 (and the cushion 190), the cushion 190 may expand. The cushion 190 may then absorb some force from the contact member 130 when the contact member 130 is returned to the glass 10, causing the cushion 190 to return to the compressed configuration.

The cushion 190 may be constructed of, for example, open celled polyurethane, and fast-recovery memory foam may be particularly useful. Those skilled in the art will appreciate that other materials which may quickly return to their original configuration after being compressed may similarly be used.

While the positioning of the apparatus 100 may vary (based, for example, on the type of glass application), in some embodiments where the glass 10 is a windshield, multiple apparatus 100 may be dispersed along a perimeter of the glass 10 and/or behind the rear view mirror so as not to unnecessarily obstruct the driver's view.

Figure 6:
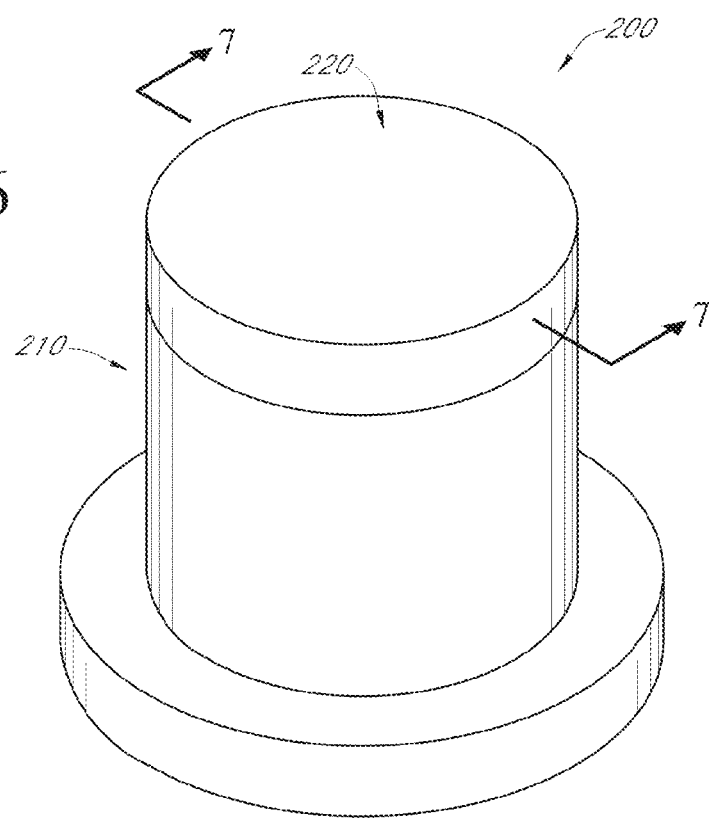
FIG. 6 is a perspective view showing an apparatus for inhibiting glass breakage according to another embodiment of the current invention, with a distal end of the apparatus visible.
Figure 7:
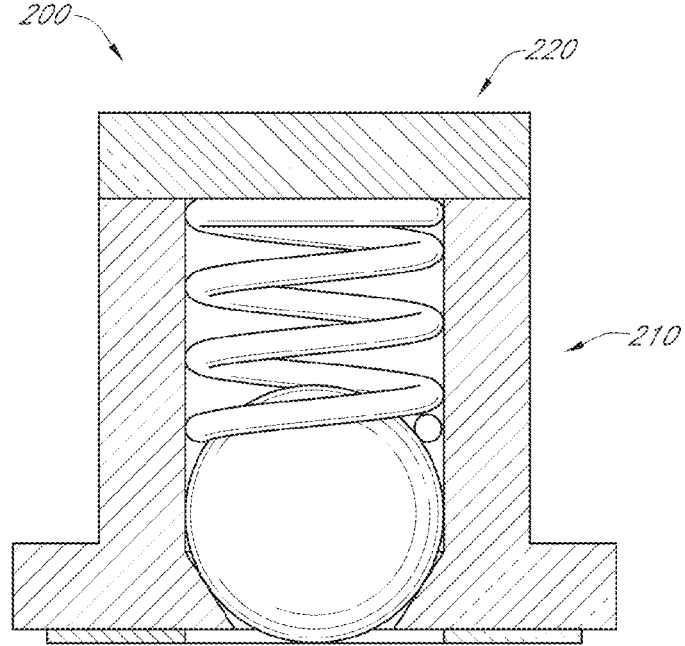
FIG. 7 is a side view of the apparatus of FIG. 6, with various elements shown in section taken along line 7-7 in FIG. 6.
Figure 8:
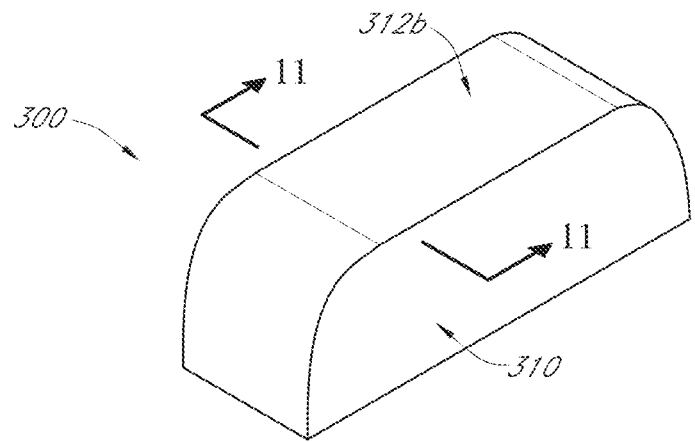
FIG. 8 is a perspective view showing an apparatus for inhibiting glass breakage according to still another embodiment of the current invention, with a distal end of the apparatus visible.

FIGS. 6 and 7 show another apparatus 200 for inhibiting glass breakage that is substantially similar to the embodiment 100, except as specifically noted and/or shown, or as would be inherent. Further, those skilled in the art will appreciate that the embodiment 100 (and thus the embodiment 200) may be modified in various ways, such as through incorporating all or part of any of the various described embodiments, for example. For uniformity and brevity, reference numbers between 200 and 299 may be used to indicate parts corresponding to those discussed above numbered between 100 and 199 (e.g., housing 210 corresponds generally to the housing 110), though with any noted or shown deviations.

In embodiment 200, endcap 220 is fused to housing 210. For example, the housing 210 and the endcap 220 may be plastic coupled together through friction welding or ultrasonic welding.

FIGS. 8 through 11 show another apparatus 300 for inhibiting glass breakage that is substantially similar to the embodiment 100, except as specifically noted and/or shown, or as would be inherent. Further, those skilled in the art will appreciate that the embodiment 100 (and thus the embodiment 300) may be modified in various ways, such as through incorporating all or part of any of the various described embodiments, for example. For uniformity and brevity, reference numbers between 300 and 399 may be used to indicate parts corresponding to those discussed above numbered between 100 and 199 (e.g., housing 310 corresponds generally to the housing 110), though with any noted or shown deviations.

Figure 9:
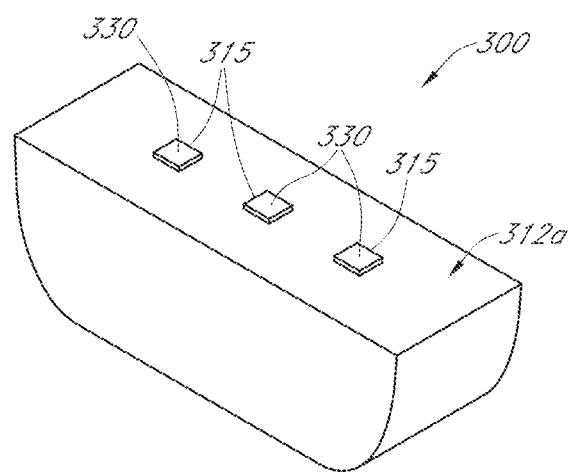
FIG. 9 is a perspective view of the apparatus of FIG. 8, with a proximal (or "contact") end of the apparatus visible.
Figure 10:
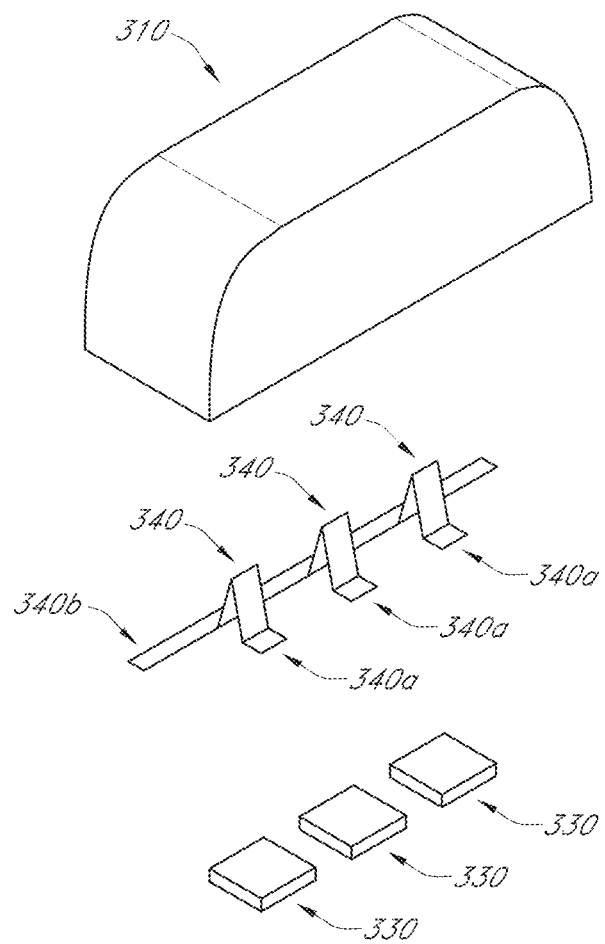
FIG. 10 is an exploded view of the apparatus of FIG. 8, with contact members and biasing members separated from a housing.

In embodiment 300, the housing 310 is sized to contain more than one of the contact members 330. Further, as shown in FIG. 9, the housing contact end 312*a* has more than one of the apertures 315, and the apparatus 300 may further include at least one cushion 390 (FIG. 11) inside the housing 310 associated with each aperture 315. While embodiment 300 has three rectangular apertures 315, a generally rectangular contact end 312*a*, and a rounded distal end 312*b*, the housing 310 can be configured in various ways (as noted regarding the embodiment 100) and may include more or fewer apertures 315 of any appropriate shape to correspond to the contact member(s) 330. And while the drawings show the housing 310 to be a unitary member, it may generally be formed of multiple segments coupled together during a manufacturing process.

The contact members 330 are disposed at least primarily inside the housing 310, with each of the contact members 330 being associated with (and biased toward) a respective aperture 315. The embodiment 300 includes rectangular contact members 330 each having a recess 331 (FIG. 11), and the apertures 315 are smaller than the contact members 330 such that the contact members 330 cannot completely pass through the apertures 315. Such sizing may be particularly desirable when the apparatus 300 is for "aftermarket" use (i.e., when the glass product is not sold with the apparatus 300).

Figure 11:
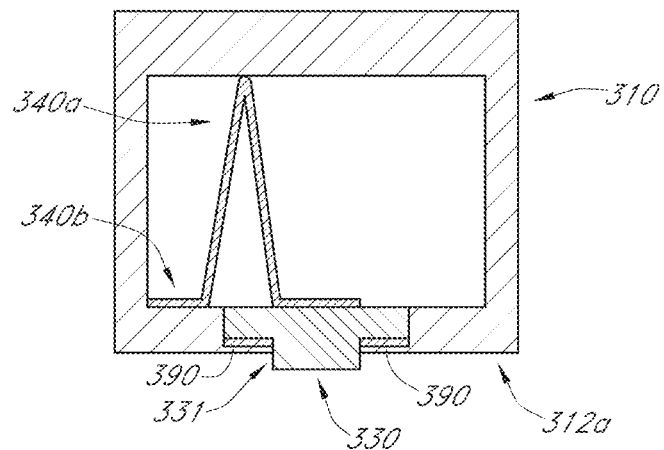
FIG. 11 is a section view of the apparatus of FIG. 8, taken along line 11-11 in FIG. 8.

When multiple contact members 330 are included, they may be biased toward the apertures 315 by a single biasing member 340, or by multiple biasing members 340. The embodiment 300 includes multiple biasing members 340, shown to be flat springs 340*a* coupled to one another by a rail 340*b*. More particularly, the embodiment 300 includes a piece of stamped metal bent to define the flat springs 340*a*. While FIG. 11 shows an upper end of a respective flat spring 340*a* touching the housing 310, other embodiments employing flat springs 340*a* may include a spacing between the spring upper ends and the housing 310. And, as discussed above regarding the embodiment 100, other types of biasing members 310 may be used.

Figure 12:
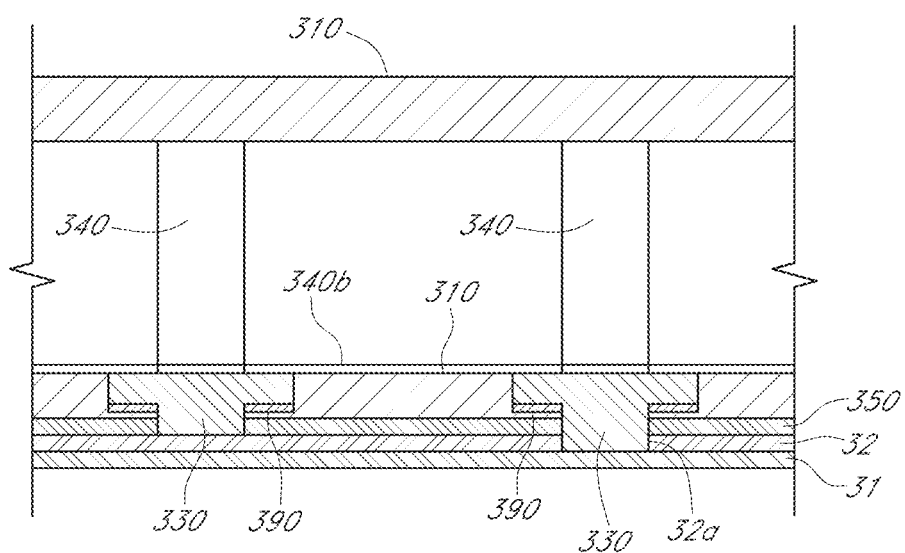
FIG. 12 is a section view of one embodiment of a glass product incorporating the apparatus of FIG. 8.

FIG. 12 shows the apparatus 300 in one method of use, and a resulting glass product. First and second sheets of glass 31, 32 may be spaced apart or laminated together (as shown). Windshield applications, for example, may include lamination; window applications, for example, may include spacing. The second sheet of glass has at least one opening 32*a* therein, and the contact end 312*a* of the housing 310 is coupled to at least one of the sheets 31, 32. One of the contact members 330 passes through a respective opening 32*a* and rests upon the first sheet 31 for receiving an impact force from the first sheet 31. Another of the contact members 330 rests upon the second sheet 32 for receiving an impact force from the second sheet 32. Forces from each sheet 31, 32 are transferred generally as described above regarding FIGS. 1 through 5. By receiving at least a portion of an impact force from the sheet 31, the apparatus 300 may be better able to prevent breakage than if only the sheet 32 were contacted.

Figure 12A:
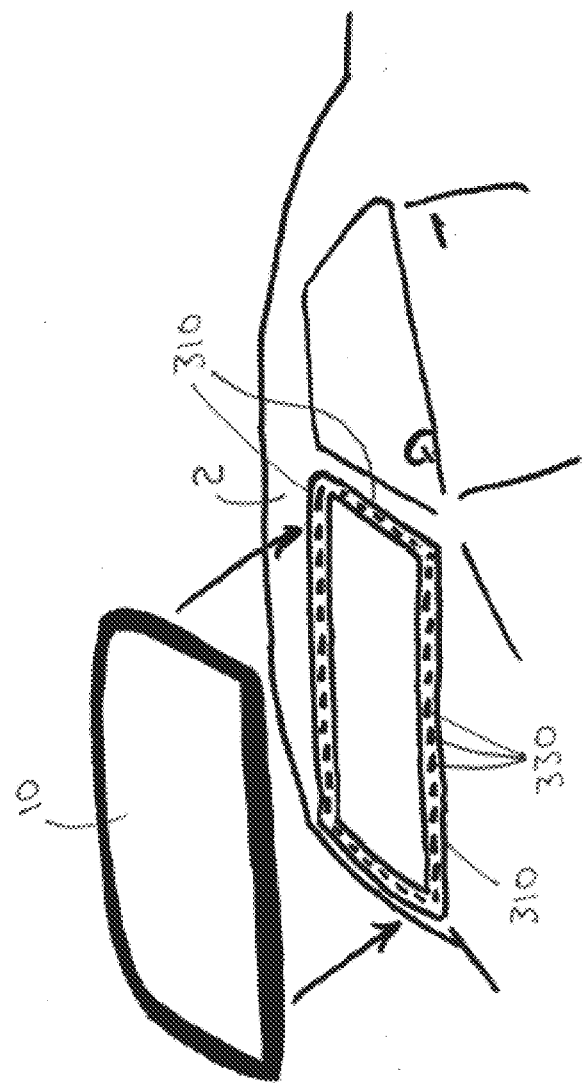
FIG. 12a is an exploded view showing another embodiment of the apparatus of FIG. 8 in an example use.

FIG. 12*a* shows the apparatus 300 configured as a ribbon (i.e., with the housing 310 elongated and having a reduced distance between ends 312*a*, 312*b*) and positioned between the windshield 10 and an automobile body 2. In such embodiments, the windshield 10 may be directly installed atop the apparatus 300.

Figure 13:
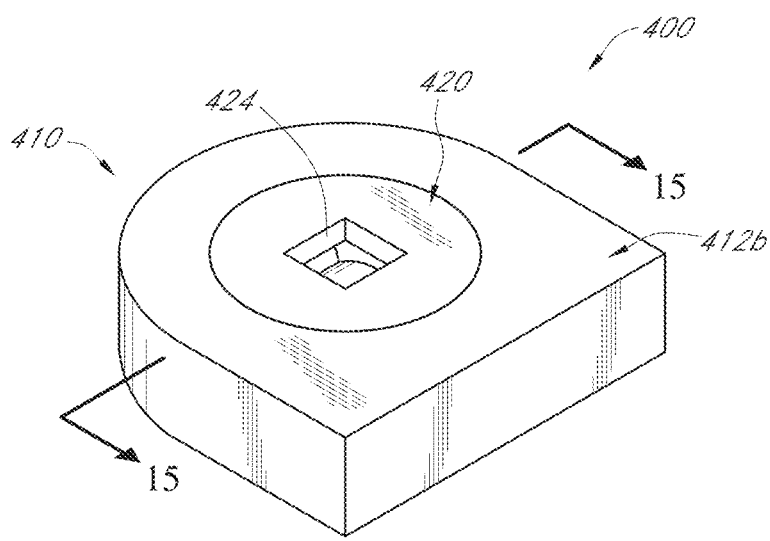
FIG. 13 is a perspective view showing an apparatus for inhibiting glass breakage according to yet another embodiment of the current invention, with a distal end of the apparatus visible.
Figure 14:
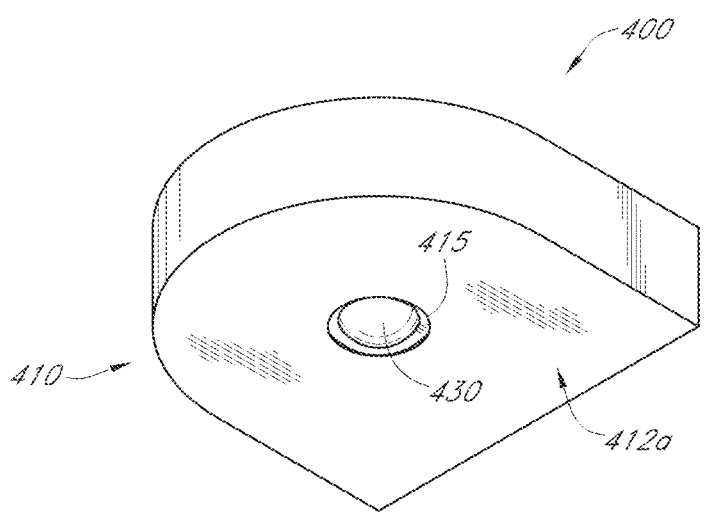
FIG. 14 is a perspective view of the apparatus of FIG. 13, with a proximal (or "contact") end of the apparatus visible.
Figure 15:
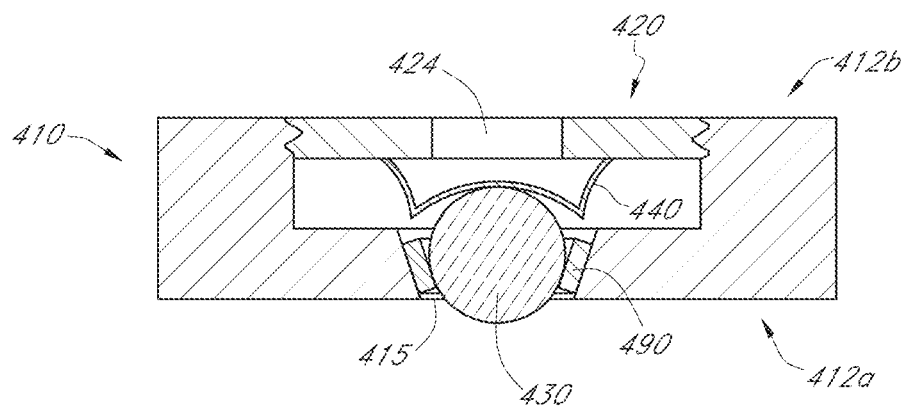
FIG. 15 is a section view of the apparatus of FIG. 13, with various elements shown in section taken along line 15-15 in FIG. 13.

FIGS. 13 through 15 show another apparatus 400 for inhibiting glass breakage that is substantially similar to the embodiment 100, except as specifically noted and/or shown, or as would be inherent. Further, those skilled in the art will appreciate that the embodiment 100 (and thus the embodiment 400) may be modified in various ways, such as through incorporating all or part of any of the various described embodiments, for example. For uniformity and brevity, reference numbers between 400 and 499 may be used to indicate parts corresponding to those discussed above numbered between 100 and 199 (e.g., housing 410 corresponds generally to the housing 110), though with any noted or shown deviations.

In embodiment 400, the housing 410 is configured as a rear view mirror mount, such that the housing 410 may be coupled to a windshield and a rear view mirror may in turn be coupled to the housing 410. While it may be particularly desirable for the housing 410 to be constructed of metal, other materials (e.g., plastic, ceramic, or glass) may alternately be used. The biasing member 440 shown in FIG. 15 is another type of flat spring. But, as noted above, other types of biasing members may be used.

Figure 16:
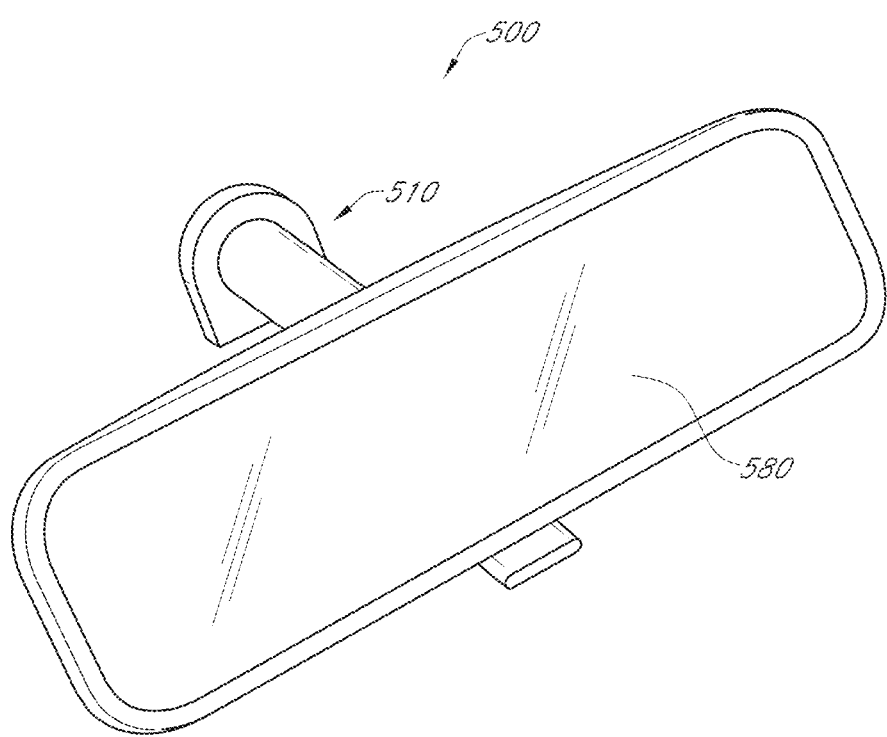
FIG. 16 is a perspective view showing an apparatus for inhibiting glass breakage according to still yet another embodiment of the current invention.
Figure 17:
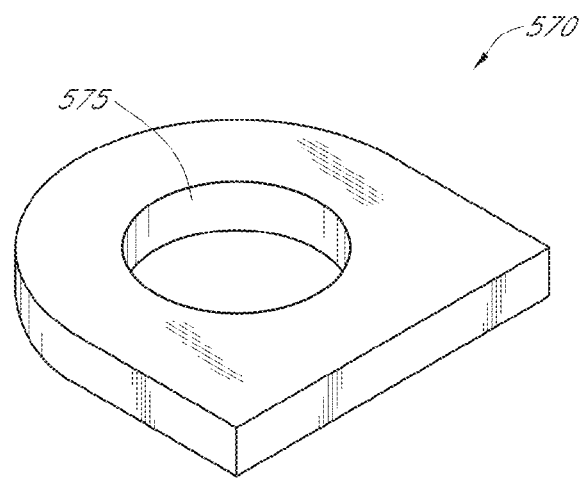
FIG. 17 is a perspective view showing a mount of the apparatus of FIG. 16.
Figure 18:
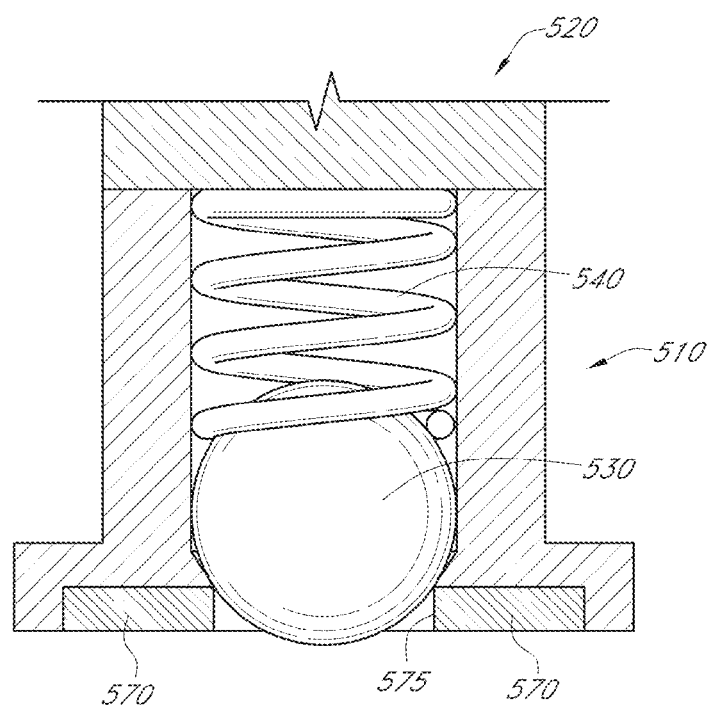
FIG. 18 is a section view of part of the apparatus of FIG. 16, with various elements shown in section.

FIGS. 16 through 18 show another apparatus 500 for inhibiting glass breakage that is substantially similar to the embodiment 100, except as specifically noted and/or shown, or as would be inherent. Further, those skilled in the art will appreciate that the embodiment 100 (and thus the embodiment 500) may be modified in various ways, such as through incorporating all or part of any of the various described embodiments, for example. For uniformity and brevity, reference numbers between 500 and 599 may be used to indicate parts corresponding to those discussed above numbered between 100 and 199 (e.g., housing 510 corresponds generally to the housing 110), though with any noted or shown deviations.

In embodiment 500, the housing 510 is configured to attach to a rear view mirror mount 570, such that the housing 510 overlays the mount 570 for example. And in the embodiment 500, endcap 520 is shown fused to the housing 510. The endcap 520 may extend to a mirror portion 580, and a ball and socket joint or other structure may be utilized to allow positioning of the mirror portion 580 to be easily adjusted. In other embodiments, the housing 510 may extend to the mirror portion 580 (with any adjustment elements included), and other structure (e.g., set screws or removable plates) may be used to support the biasing member 540. A cushion corresponding to the cushion 190 may of course be included in the housing 510.

In use, the mount 570 is coupled to a windshield, and the housing 510 is coupled to the mount 570 such that the contact member 530 passes through a hole 575 in the mount 570 and rests on the windshield. Force transfer may occur generally as set forth above to inhibit glass breakage, and the mirror portion 580 may be used in a traditional manner to improve a user's view.

Figure 19:
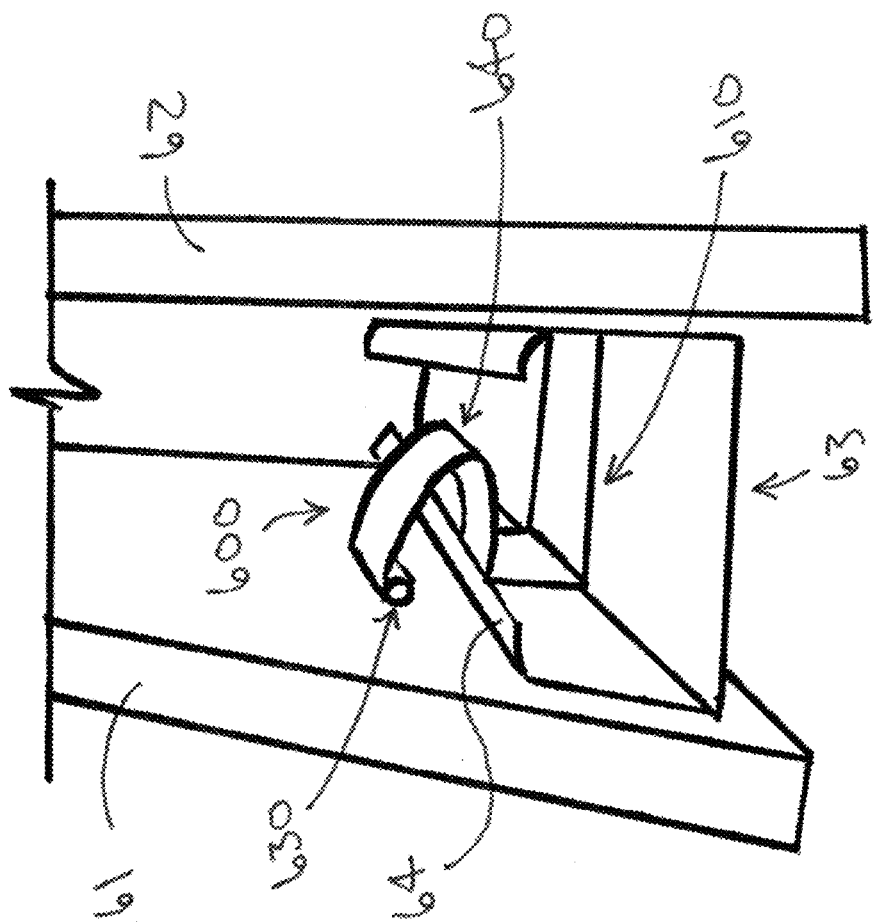
FIG. 19 is a perspective view of an apparatus for inhibiting glass breakage and a resulting glass product according to a further embodiment of the current invention.
Figure 20:
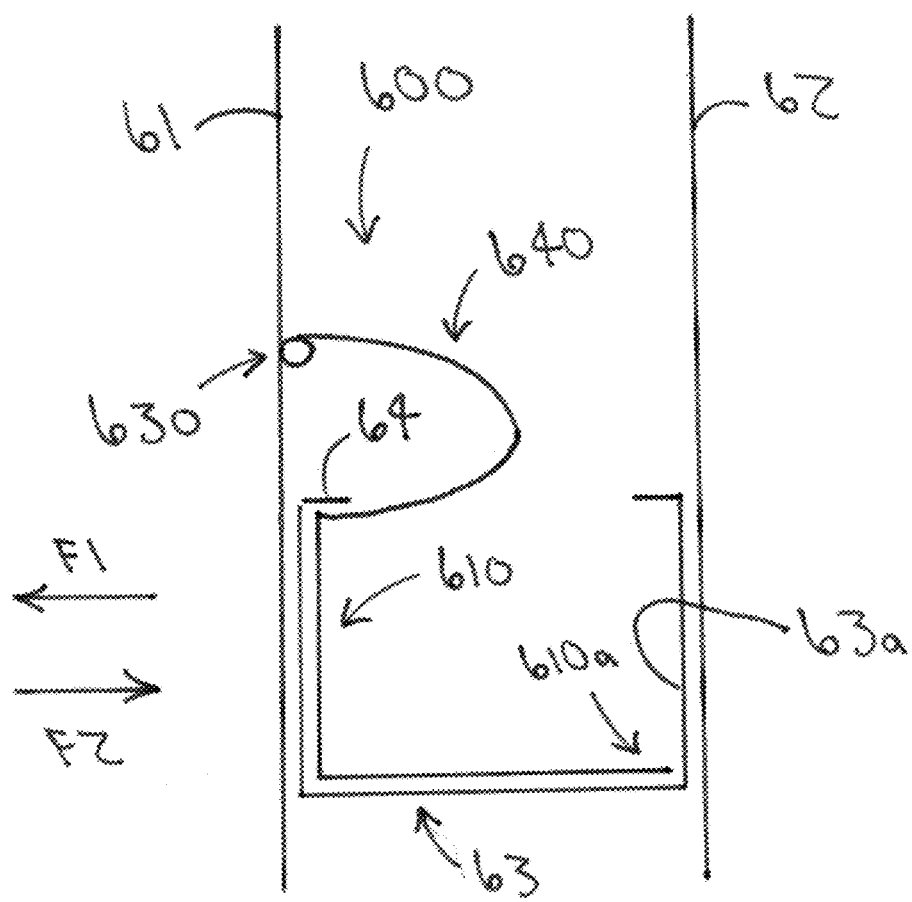
FIG. 20 is a side view of the apparatus and resulting glass product of FIG. 19.

FIGS. 19-20 show another apparatus 600 for inhibiting glass breakage in one method of use, and a resulting glass product. First and second sheets of glass 61, 62 are spaced apart by a spacer 63 that includes a ledge 64. A bonding agent (not shown) may couple the spacer 63 to the glass 61, 62. The apparatus 600 includes a base portion 610, a contact member 630, and a biasing member 640. In some embodiments, the base portion 610, the contact member 630, and the biasing member 640 are all made of a continuous, unitary material (e.g., resilient metal, resilient plastic, et cetera), either with or without an overlying coating; in other embodiments, one or more of the portions 610, 630, 640 are formed separately and coupled to the other portions (e.g., by adhesive, welding, et cetera). The base portion 610 is configured to interact with the ledge 64 to maintain the base portion 610 stationary relative to the glass 61, 62 and the spacer 63. Adhesive or other fastening methods may or may not be used to further fix the base portion 610 to the spacer 63, and distal end 610a of the base portion 610 may or may not extend to spacer face 63a.

Continuing, the contact member 630 abuts the glass 61, and the biasing member 640 biases the contact member 630 toward the glass 61. As shown in FIGS. 19-20, it may be desirable for the contact member 630 to be generally round to provide a single point of contact between the contact member 630 and the glass 61. Nevertheless, the contact member 630 may be configured to be shaped differently. As with the contact member 130 described above, rubber and glass may also be suitable materials for the contact member 630. Rubberized coatings on resilient or non-resilient materials may further be acceptable. The apparatus 600 in FIGS. 19-20 is formed of a unitary sheet of material bent to define the base portion 610, the contact member 630, and the biasing member 640, and one end of the sheet is rolled to define the contact member 630.

The biasing member 640 specifically causes the contact member 630 to impart a first force in direction F1 on the glass 61, and the system may remain in this configuration until the glass 61 receives an impact force in direction F2 (e.g., imparted by flying debris). Upon receipt of the impact force F2, the glass 61 may transfer at least a portion of the impact force F2 to the contact member 630, which in turn may transfer force to the biasing member 640. The biasing member 640 may then return part of the force F2 to the glass 61 via the contact member 630. In some embodiments, the contact member 630 may move from the glass 61 upon receiving the portion of the impact force F2.

Inefficiencies in the biasing member 640, for example, may cause less than the full amount of force transferred to the contact member 630 from the glass 61 to be returned to the glass 61. This may be particularly advantageous if multiple apparatus 600 are used with the glass 61. In addition, if multiple apparatus 600 are used with the glass 61, the timing of the force transfer may vary slightly between the different apparatus 600, allowing forces to be transferred back to the glass 61 at different times. The glass 61 may be able to withstand this staggered return of forces better than the impact force F2 if the multiple apparatus 600 were not utilized.

To further dissipate the impact force F2, a cushion may be coupled to the contact member 630 (e.g., using adhesive or other appropriate fastening devices and methods). In such embodiments, the cushion may be initially compressed when the contact member 630 contacts the glass 61. Upon movement of the contact member 630 away from the glass 61, the cushion may expand. The cushion may then absorb some force from the contact member 630 when the contact member 630 is returned to the glass 61, causing the cushion to return to the compressed configuration. The cushion may be constructed of, for example, open celled polyurethane, and a fast-recovery memory foam may be particularly useful. Those skilled in the art will appreciate that other materials which may quickly return to their original configuration after being compressed may similarly be used.

Figure 21:
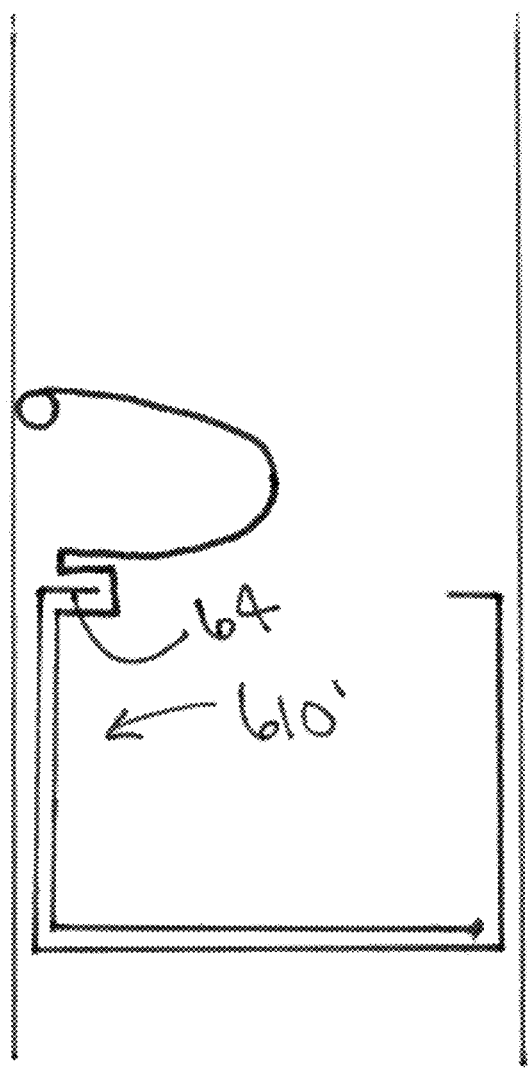
FIG. 21 shows an alternate base portion for use in the apparatus of FIG. 19.

FIG. 21 shows an alternate base portion 610' for use in the apparatus 600. The alternate base portion 610' illustrates that various configurations may be appropriate for interacting with the ledge 64.

Figure 22:
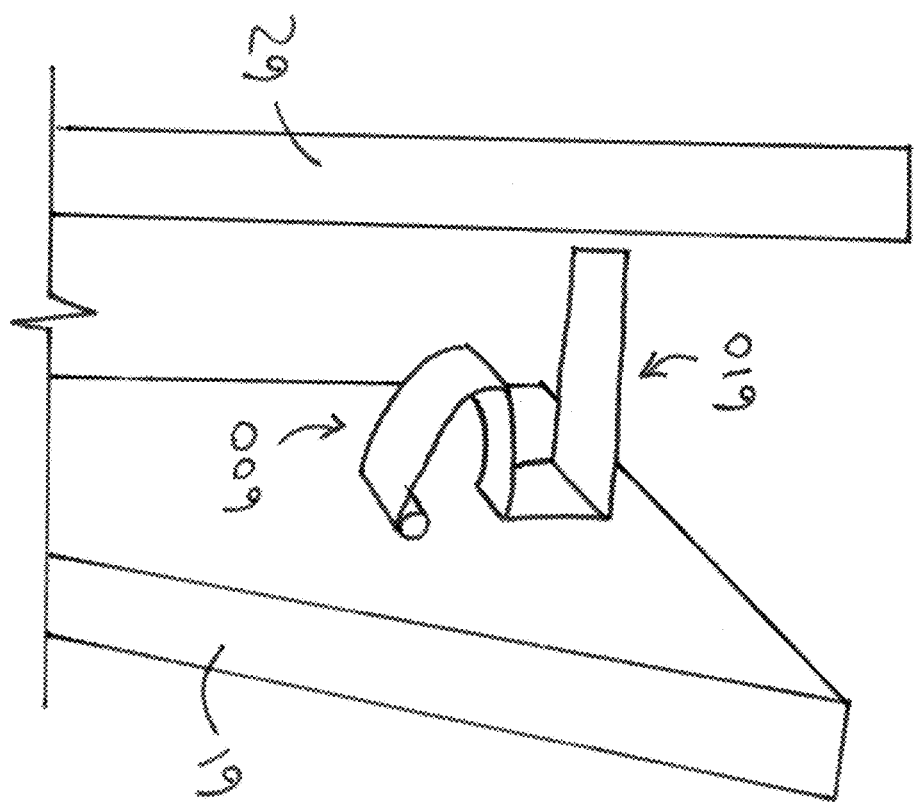
FIG. 22 is a perspective view of an apparatus for inhibiting glass breakage and a resulting glass product according to a still further embodiment of the current invention.

FIG. 22 shows the apparatus 600 for inhibiting glass breakage and a resulting glass product (slightly exploded) that is substantially similar to as described above regarding embodiment 600, except as specifically noted and/or shown, or as would be inherent. In FIG. 22, the spacer 63 is not present (or at least not utilized). As such, the base portion 610 extends in a pressure fit between glass sheets 61, 62. Adhesive or other fastening methods may or may not be used to further fix the base portion 610 to the glass 61, 62.

Figure 22A:
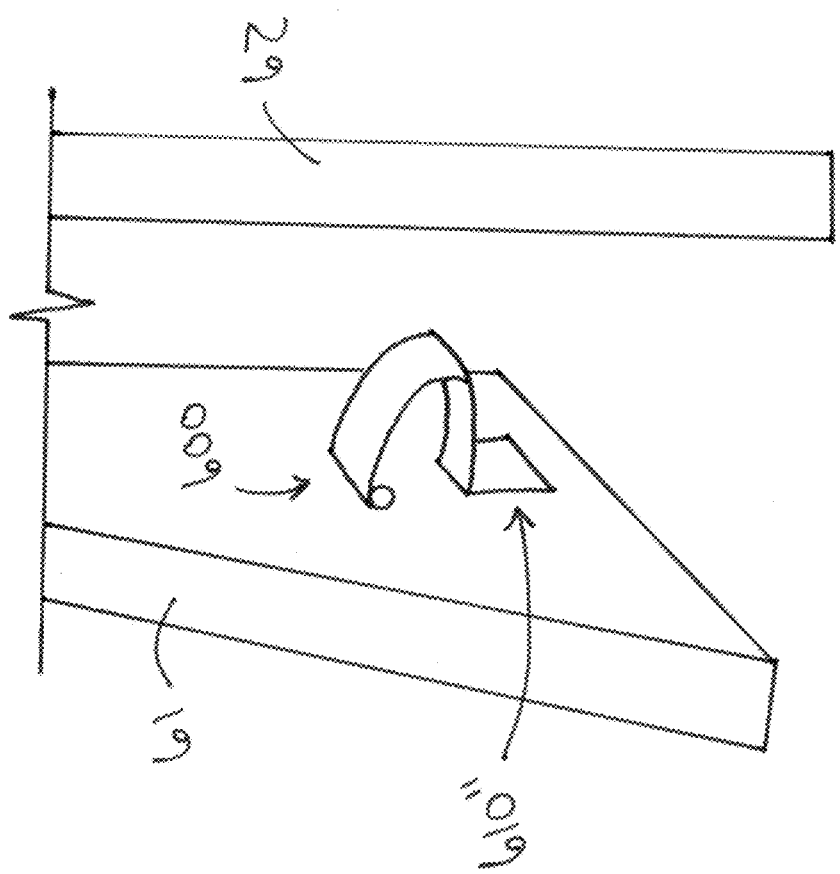
FIG. 22a shows an alternate base portion for use in the apparatus of FIG. 19.

FIG. 22a shows another alternate base portion 610" for use in the apparatus 600. Here, alternate base portion 610" is coupled to the glass sheet 61 (e.g., by adhesive). The alternate base portion 610" illustrates that various base configurations may be appropriate for interacting with the glass 61, 62 (or the spacer 63).

Figure 23:
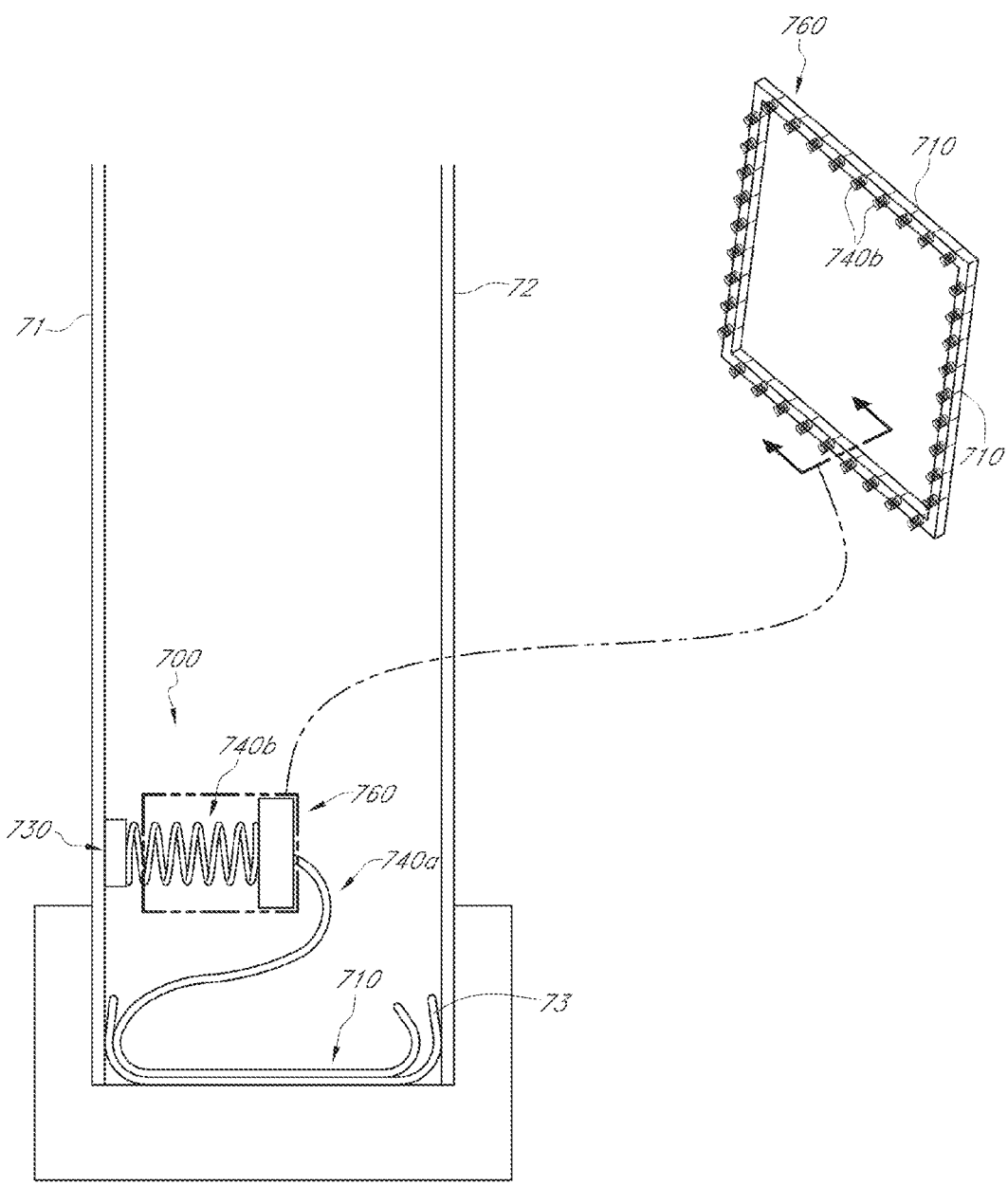
FIG. 23 is a perspective view of an apparatus for inhibiting glass breakage and a resulting glass product according to still yet another embodiment of the current invention.

FIG. 23 shows another apparatus 700 for inhibiting glass breakage in one method of use that is substantially similar to embodiment 600, except as specifically noted and/or shown, or as would be inherent. Further, those skilled in the art will appreciate that the embodiment 700 (and thus the embodiment 600) may be modified in various ways, such as through incorporating all or part of any of the various described embodiments, for example. For uniformity and brevity, reference numbers between 700 and 799 may be used to indicate parts corresponding to those discussed above numbered 600-699 (e.g., contact member 630 corresponds generally to contact member 730) though with any noted or shown deviations. In an embodiment, the apparatus 700 includes a base portion 710, a contact member 730, a first biasing member 740a, a second biasing member 740b, and a rail 760.

The rail 760 may be a piece of material extending around the perimeter of a window frame between a first sheet of glass 71 and a second sheet of glass 72 or may be, for example, a grid pattern visible through the glass 71, 72. The first and second sheets of glass 71, 72 may be spaced apart by a spacer 73. The base portion 710 may, for example, fit snugly within the spacer 73 between the first and second sheets of glass 71, 72. The first biasing member 740a abuts the rail 760. The second biasing member 740b extends from the rail 760 to the contact member 730, and the contact member 730 abuts the first sheet of glass 71. The first biasing member 740a biases against the rail 760, which supports the second biasing member 740b, which biases the contact member 730 toward the glass 71.

When a force is received against the first sheet of glass 71, at least a portion of the force is transferred to the contact member 730. The contact member 730 pushes against the second biasing member 740b which causes temporary deformation of the second biasing member 740b as it pushes against the rail 760 and may allow the contact member 730 to separate from the glass 71. If the force upon the first sheet of glass 71 is great enough, then the force transferred to the rail 760 by the second biasing member 740b may be sufficient to cause temporary deformation of the first biasing member 740a and movement of the rail 760. The first biasing member 740a, the rail 760, the second biasing member 740b, and the contact member 730 may eventually each return to their initial positions. As described above, cushions may be used (e.g., with the contact member 730), and the amount of force transferred back to the first sheet of glass 71 may be less than the force initially received. Additionally, as set forth in FIG. 23, multiple base portions 710, biasing members 740a, 740b, and contact members 730 may be associated with the rail 760.

Figure 24:
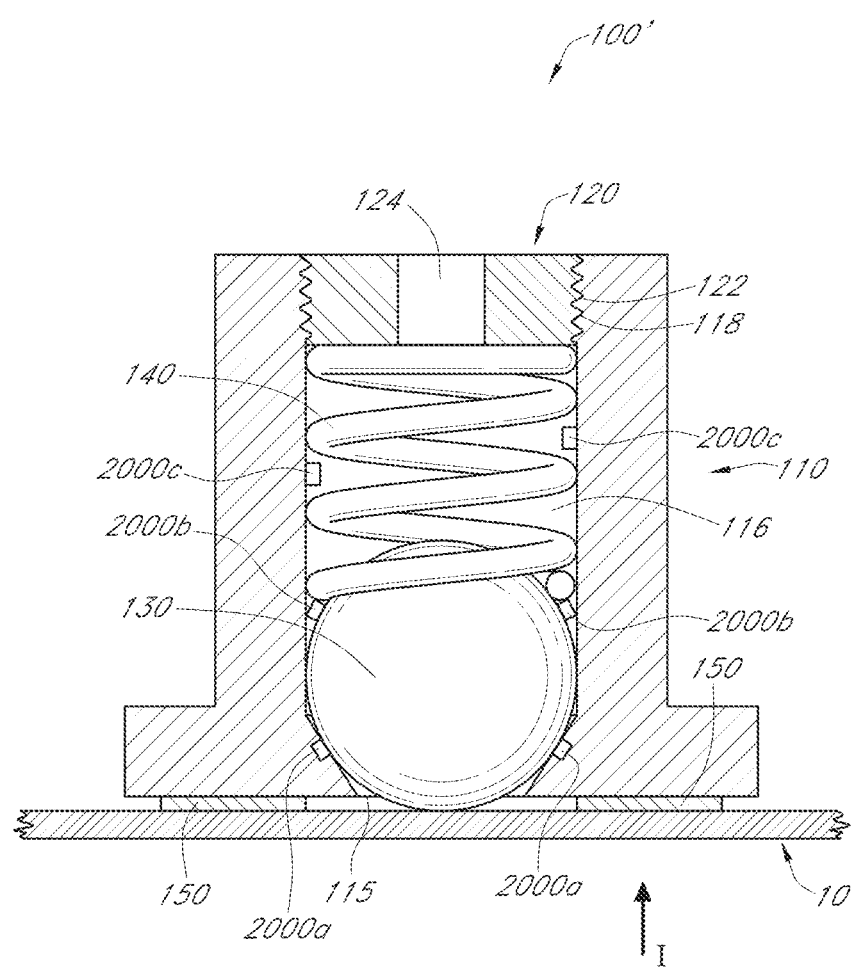
FIG. 24 is a side view of the apparatus of FIG. 1 in use, with various elements shown in section taken along line 3-3 in FIG. 1, and incorporating sensors.
Figure 25:
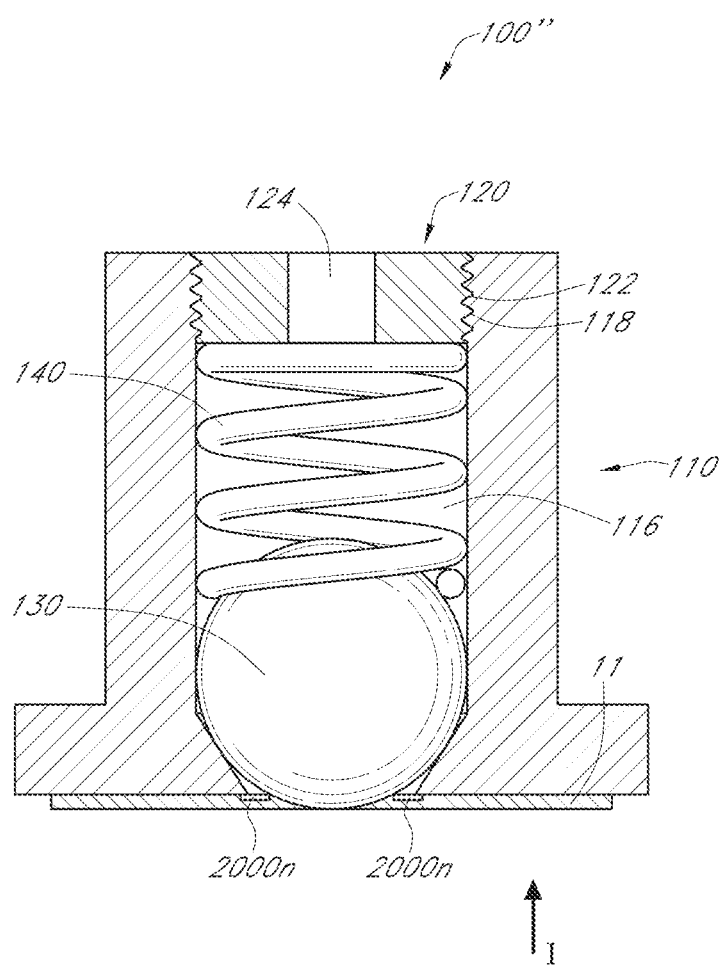
FIG. 25 is a side view of the apparatus of FIG. 6, taken along line 7-7 in FIG. 6 and further incorporating sensors.

FIGS. 24-25 show another apparatus 800 for dispersing impact forces that is substantially similar to the embodiment 100, except as specifically noted and/or shown, or as would be inherent. Further, those skilled in the art will appreciate that the embodiment 100 (and thus embodiment 800) may be modified in various ways, such as through incorporating all or part of any of the various described embodiments, for example. For uniformity and brevity, references numbers between 800 and 899 may be used to indicate parts corresponding to those discussed above numbered between 100 and 199 (e.g., housing 810 corresponds generally to housing 110), though with any noted or shown deviations.

FIGS. 24-33 show alternative embodiments of various apparatus incorporating sensors 1000 as part of the apparatus. The sensors 1000 may, for example, be enabled to detect movement of a surface in response to a force acting upon a surface, and to cause an alert to be activated.

FIGS. 24 and 25 show apparatus 100', 100" that are substantially similar to embodiment 100, except as specifically noted and/or shown, or as would be inherent. In FIG. 24, sensors 2000 are placed at various locations inside the housing 110 such that a force acting upon the sheet of glass 10 would trigger an alert. For example, sensors 2000a may be disposed along the walls of the housing 110 forming the cavity 116. The contact member 130 may be in constant contact with the sensors 2000a. When a force I acts upon the sheet of glass 10, the contact member 130 may be forced away from the sheet of glass 10. When the contact member 130 loses contact with the sensors 2000a, the sensors 2000a may recognize that the force I caused the contact member 130 to shift off of the sensors 2000a, thus triggering an alert. Alternately, the sensors 1000 can be placed along the walls of the housing 110 near the upper edge of the contact member 130, as shown at 2000b. When the force I causes the contact member 130 to shift, the contact member 130 encounters the sensors 2000b, thus triggering an alert. In another alternative, sensors 2000 may be placed along the walls of the housing 110 between coils in a biasing member 140 (which is a helical spring in FIG. 24), as shown at 2000c. When a force I acts upon the sheet of glass 10, the contact member 130 is pushed against the spring 140, and causing the coils to contract. As the coils contract, one or more of the coils may come into contact with the sensors 2000c, thus triggering an alert. As shown in FIG. 25, the sensors 2000n may alternately be located along a contact end 11, wherein the contact member 130 sits atop the sensors 2000n and is in constant contact with the sensors 2000n. When a force is applied to the contact end 11, the contact member 130 loses contact with the sensors 2000n, thus triggering an alert.

Figure 26:
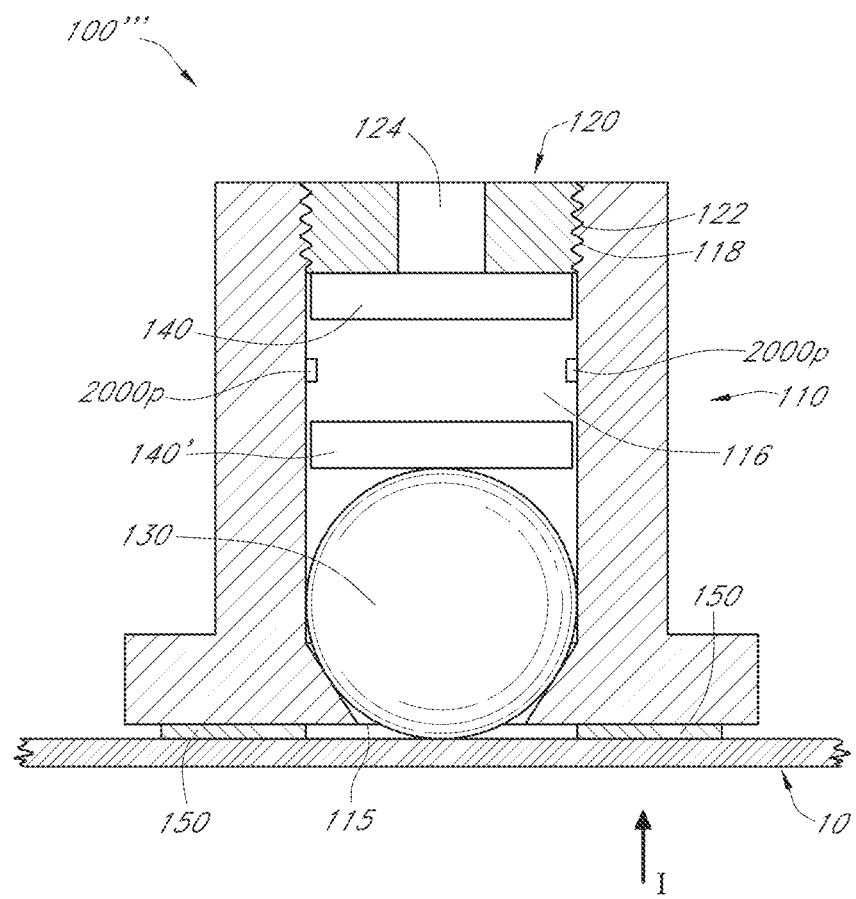
FIG. 26 is a side view of the apparatus of FIG. 1, taken along line 3-3 in FIG. 1, showing a magnetic spring and further incorporating sensors.

FIG. 26 shows an apparatus 100''' that is substantially similar to the embodiments described above with reference to FIGS. 24-25, except as specifically noted and/or shown, or as would be inherent. The difference between embodiment 100''' and those shown in FIGS. 24-25 is that the spring 140 in FIG. 26 is a magnetic spring rather than a helical spring. The sensors 2000p in FIG. 26 are shown in the cavity 116 of the housing 110. When a force is received upon the sheet of glass 10, the contact member 130 causes the magnet 140' to shift upwards. The magnet 140' may come into contact with the sensors 2000p, thus triggering an alert.

Figure 27:
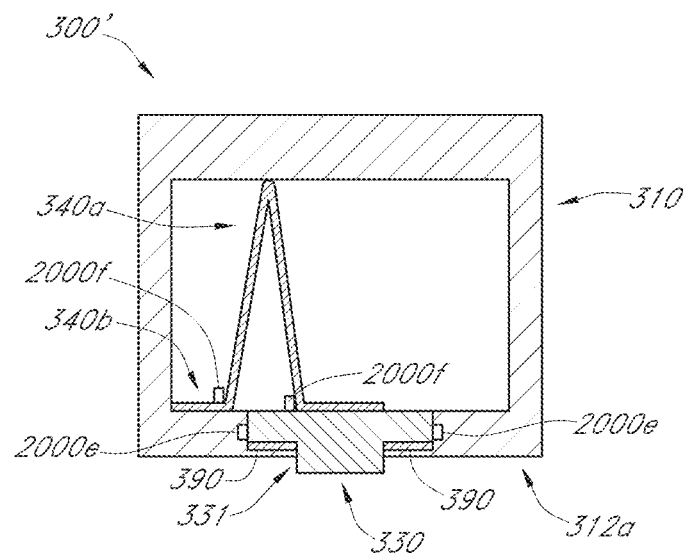
FIG. 27 is a section view of the apparatus of FIG. 8, taken along line 11-11 in FIG. 8, and further incorporating sensors.
Figure 28:
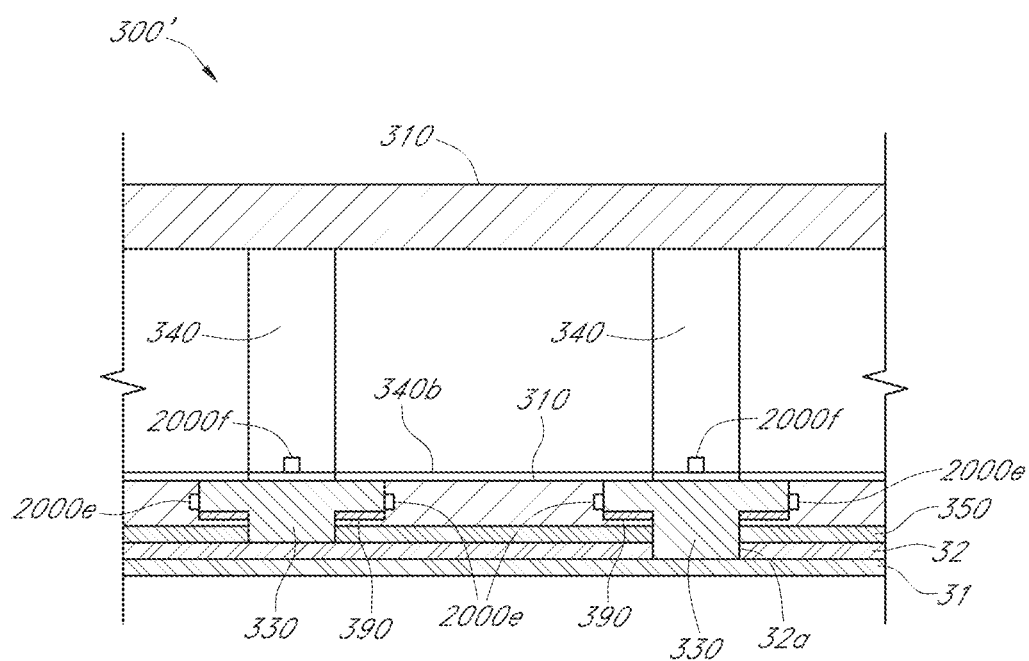
FIG. 28 is a section view of one embodiment of a glass product incorporating the apparatus of FIG. 8 and further incorporating sensors.

FIGS. 27 and 28 show an apparatus 300' that is substantially similar to embodiment 300, except as specifically noted and/or shown, or as would be inherent. Sensors 2000 may be located, for example, along the edges of the biasing member 340, as shown at 2000e. Alternately, sensors may be placed at various places on the biasing member 2000f such that movement of the biasing member triggers the sensors 2000 to initiate an alert.

Figure 29:
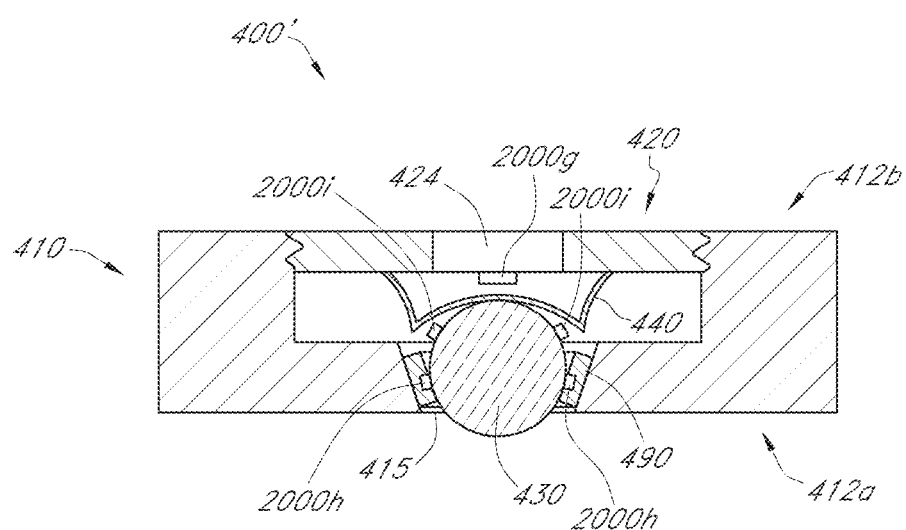
FIG. 29 is a section view of the apparatus of FIG. 13, with various elements shown in section taken along line 15-15 in FIG. 13, and further incorporating sensors.

FIG. 29 shows an apparatus 400' that is substantially similar to embodiment 400, except as specifically noted and/or shown, or as would be inherent. Sensors 2000 may be secured, for example, behind the biasing member 440, as shown at 2000g, such that movement of the contact member 430 causes the biasing member 440 to contact the sensor 2000g, thus triggering an alert. Alternately, the sensors may be located within the cushions 490 (as shown at 2000h), such that movement of the contact member 430 away from the cushion 490, or a return of the contact member 490 to the cushion 490 after a force has been received, activates the sensor 2000h. In another alternative, the sensors 2000 can be placed along the walls of the housing 410 near the upper edge of the contact member 430, as shown at 2000i. When the force I causes the contact member 430 to shift, the contact member 430 encounters the sensors 2000i, thus triggering an alert.

Figure 30:
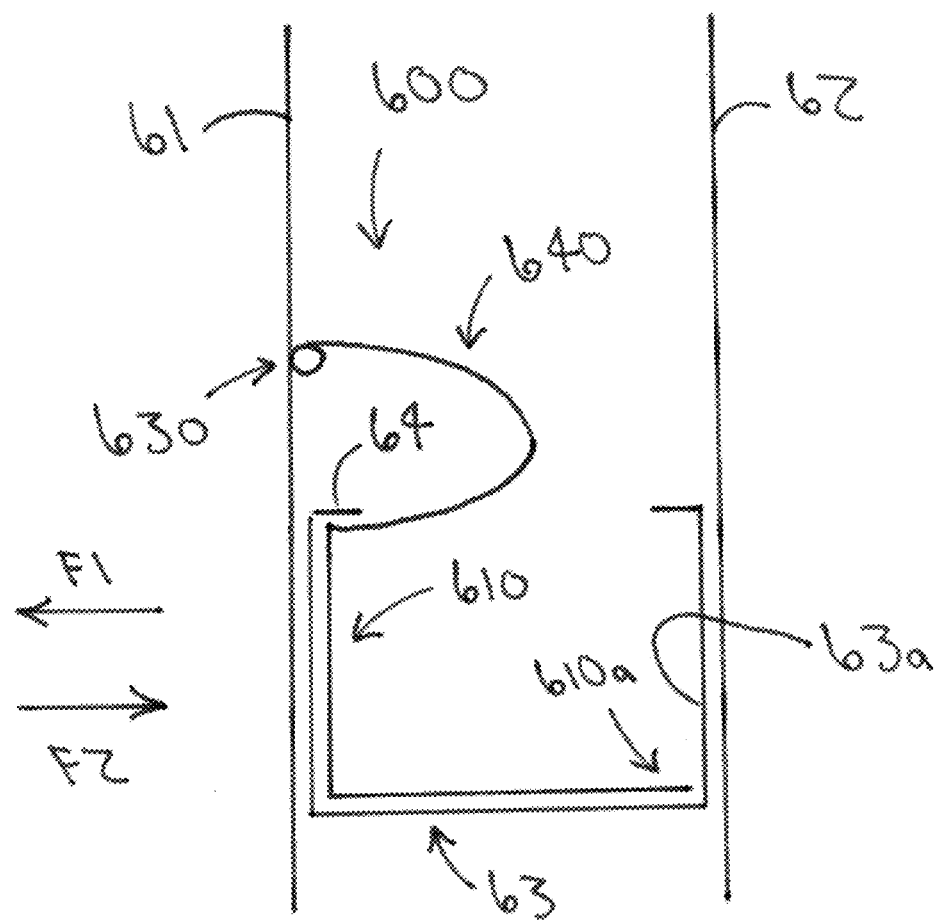
FIG. 30 is a side view of the apparatus and resulting glass product of FIG. 19, and further incorporating sensors.

FIG. 30 shows an apparatus 600' that is substantially similar to embodiment 600, except as specifically noted and/or shown, or as would be inherent. Sensors 2000 may be provided, for example, near where the contact member 630 rests upon the glass 61, as shown at 2000j, such that a force F2 received upon the glass 61 causes the contact member 630 to shift away from the glass 61, triggering the sensors 2000j. Alternately, the sensor may be located at the junction between the biasing member 640 and the base member 610, as shown at 2000k. When a force is received upon the surface of the glass 61, the biasing member 630 may be pushed away from the surface of the glass 61, thus engaging the sensor 2000k. In another alternative, a sensor 1000 may be supported behind the biasing member 640, as shown at 2000m. Again, a force F2 received upon the surface of the glass 61 causes the biasing member to shift, thus triggering the sensor 2000m.

It shall be understood that examples depicted in FIGS. 24-33 and described herein are exemplary only, and that the sensor(s) 2000 may be placed in any appropriate location such that movement of the biasing member caused by an impact force would cause the sensor 2000 to trigger an alert. Further, multiple sensors 2000 may be incorporated in an embodiment, and filtering criteria may be used to determine when to activate an alert. For example, an alert may be initiated only after two sensors 2000 detect movement.

Additionally, the sensors 2000 may be able to detect the amount of force exerted upon the surface of the glass 61 (or other surface). For example, multiple sensors 2000 may be located at various points within or along the housing 110. The amount of force exerted upon the contact surface may be determined by which sensor(s) 2000 are activated by movement of the contact member 130. The amount of force required to reach each sensor 2000 may be already known, such that if the contact member 130 contacts a first sensor 2000 along the walls of the housing 110 but not a second sensor located further from the contact member 130, the amount of force will be generally known. Alternately, the sensor(s) 2000 may be able to measure the amount of force exerted upon the contact surface and to report that information to a user.

Figure 31:
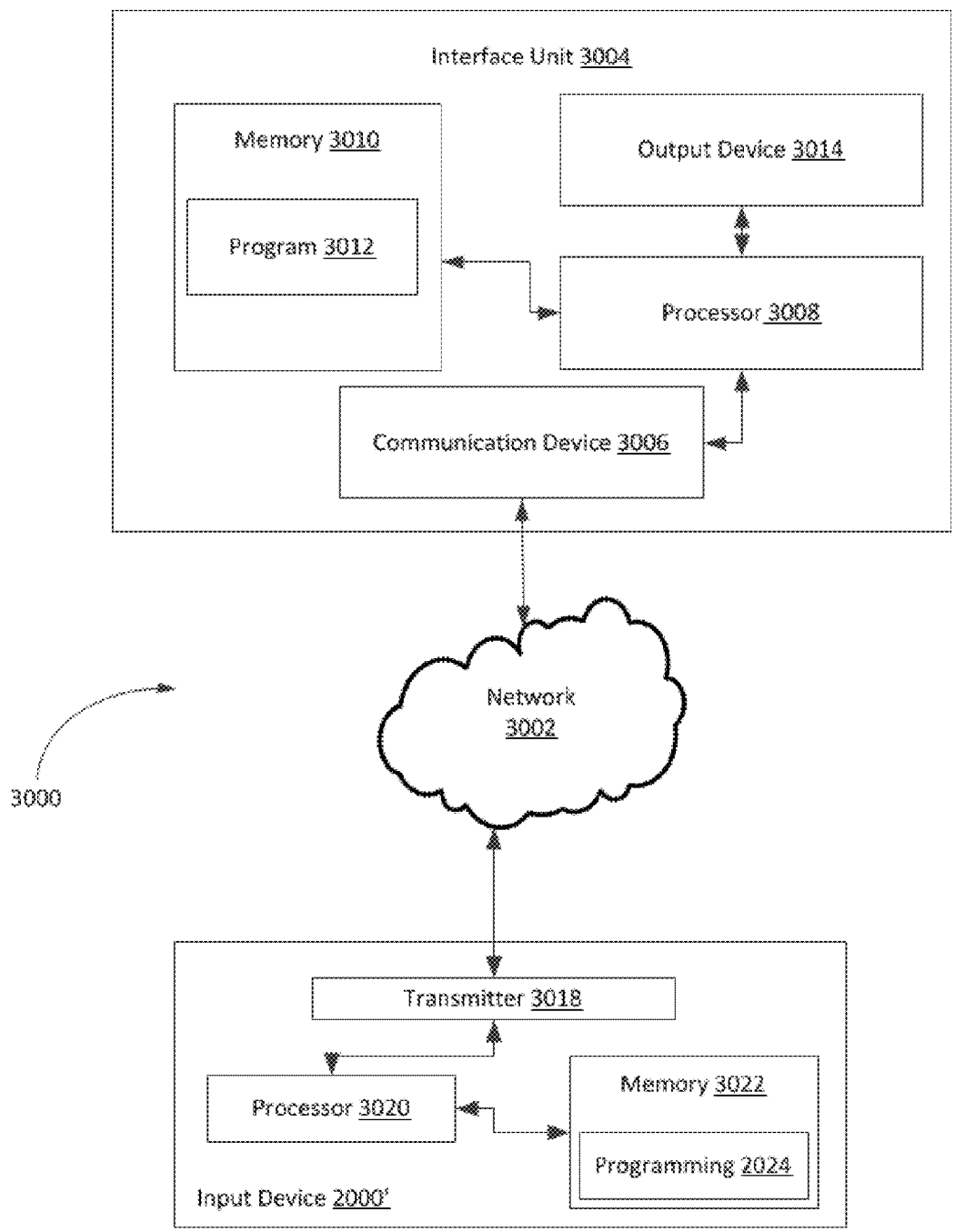
FIG. 31 is a block diagram of a system according to one embodiment of the current invention.
Figure 32:
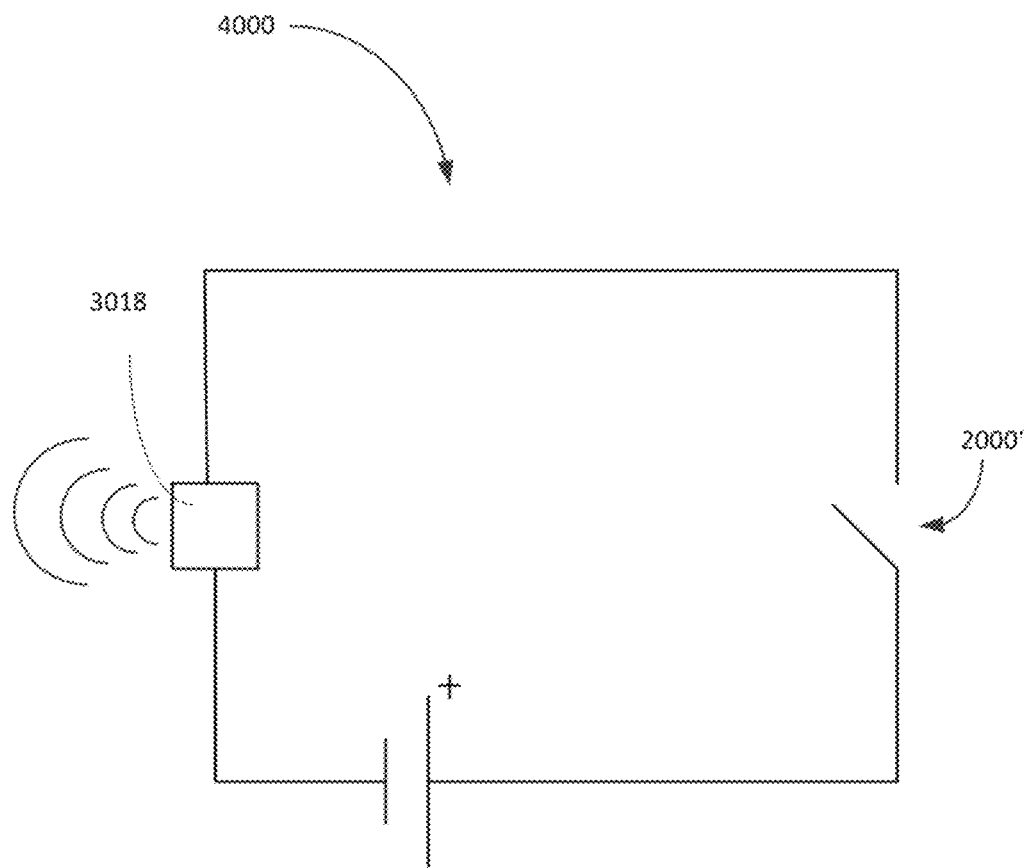
FIG. 32 is a circuit diagram of an input device as shown in FIG. 31.
Figure 33:
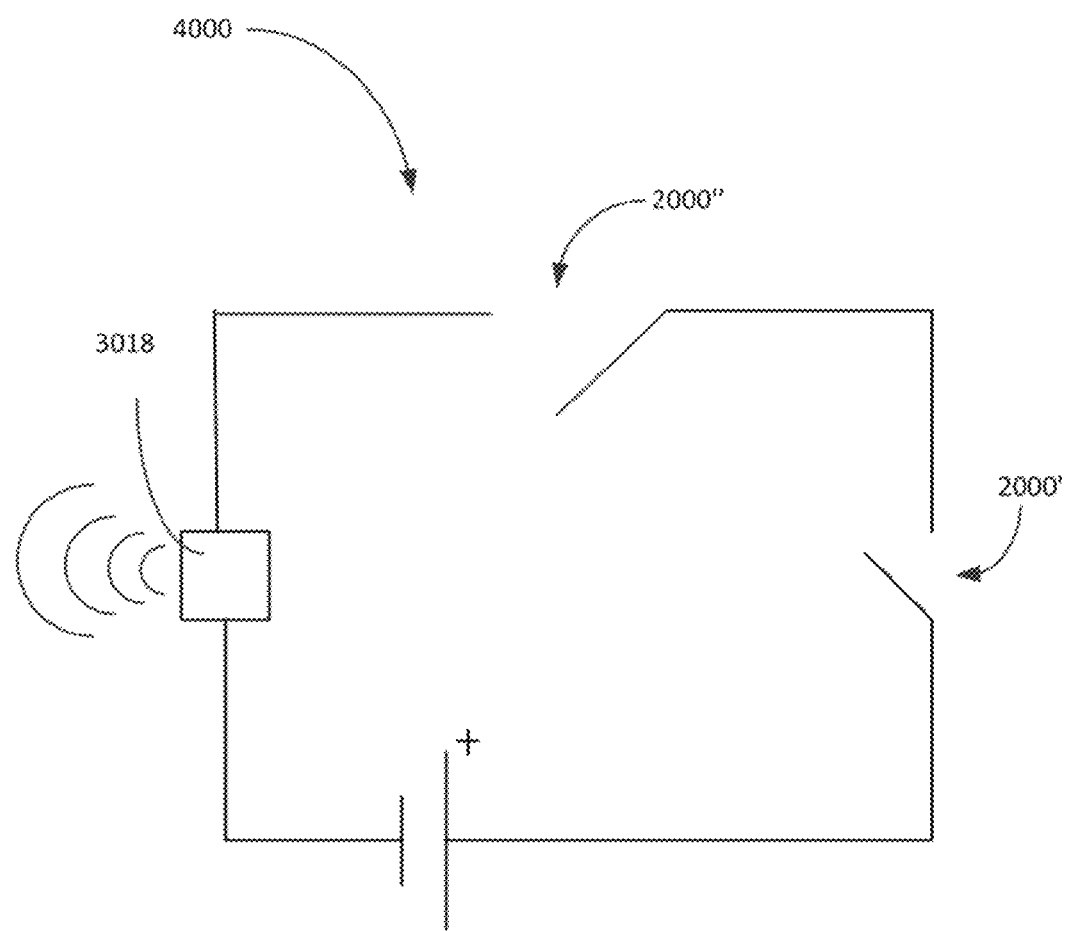
FIG. 33 is a circuit diagram of an input device as shown in FIG. 31 showing two switches.

FIG. 31 illustrates a system 3000 incorporating apparatus for dispersing impact forces. The system 3000 may include an interface unit 3004 and a sensor 2000' in data communication over a network 3002. The interface unit 3004 may include a communication device 3006, a processor 3008, an output device 3014, and non-transitory computer memory 3010 having programming 3012.

The output device 3014 may be any appropriate device, whether now existing or later developed, for presenting data from the processor 3008. This may include, for example, one or more of: a printer, a monitor, a keyboard, a computer mouse, a touchpad, a speaker, a buzzer, a light, et cetera. The communication device 3006 may be any device, whether now known or later developed, that allows the system 3000 to communicate with the network 3002. For example, the communication device 3006 may be a switch, wireless router, wired modem, et cetera. The network 3002 may be the World Wide Web, a private or local network, or a cellular network, for example.

The interface unit 3004 may be, for example, a computer or smart phone associated with a monitoring system. Alternately, the interface unit 3004 may be a home alarm that alerts the homeowner that a force has been received upon a surface having an apparatus attached thereto.

The sensor 2000', as described above regarding the sensors 2000, may be located in or on various apparatus for dispersing impact forces. The sensor 2000' may include a transmitter 3018, a processor 3020, and non-transitory memory 3022 having programming 3024. Optionally, the processor 3020, memory 3022, and programming 3024 may be separate from the sensor 2000'.

In use, a force is received upon an impact surface, causing a contact member in an apparatus for dispersing impact forces (such as those described in embodiments 100', 100", 100''', 300', 400', and 600') to shift. The shift in the contact member to (or away from) the sensor 2000' may complete a circuit 4000 shown in FIG. 32, as generally described above regarding sensing in FIGS. 24-33, and the transmitter 3018 may send an alert. In another alternative (FIG. 33), the contact member may be required to activate (e.g., shift away from) a first sensor 2000' and also activate (e.g., contact) a second sensor 2000" before the transmitter 3018 emits an alert to the interface unit 3004.

Once an alert has been sent via the transmitter 3018, the processor 3008 may then recognize the signal and cause the output device 3014 to alert the user that the sensor 2000' has been triggered.

Yet another system for monitoring activity is shown in FIGS. 34-38. In one embodiment, the system 5000 may include a window consisting of one or more window panes 5002 and a frame 5004, a plurality of muntin bars 5006, and at least one insert 5010.

As is well known in the art, muntin bars 5006 may be situated between panes of glass 5002 to provide a design element to the window. For example, muntin bars 5006 may be configured into a grid pattern (such as that shown in FIG. 34), diamond pattern, "Queen Anne" pattern, etc. Typical muntin bars 5006 may be adhered together at intersects of the horizontal and vertical muntins to form the grid or other pattern. However, these muntin bars 5006 do not serve a significant functional purpose beyond increasing the aesthetics of the window. Benefits may be recognized by incorporating various technology into the window as described below.

Figure 34:
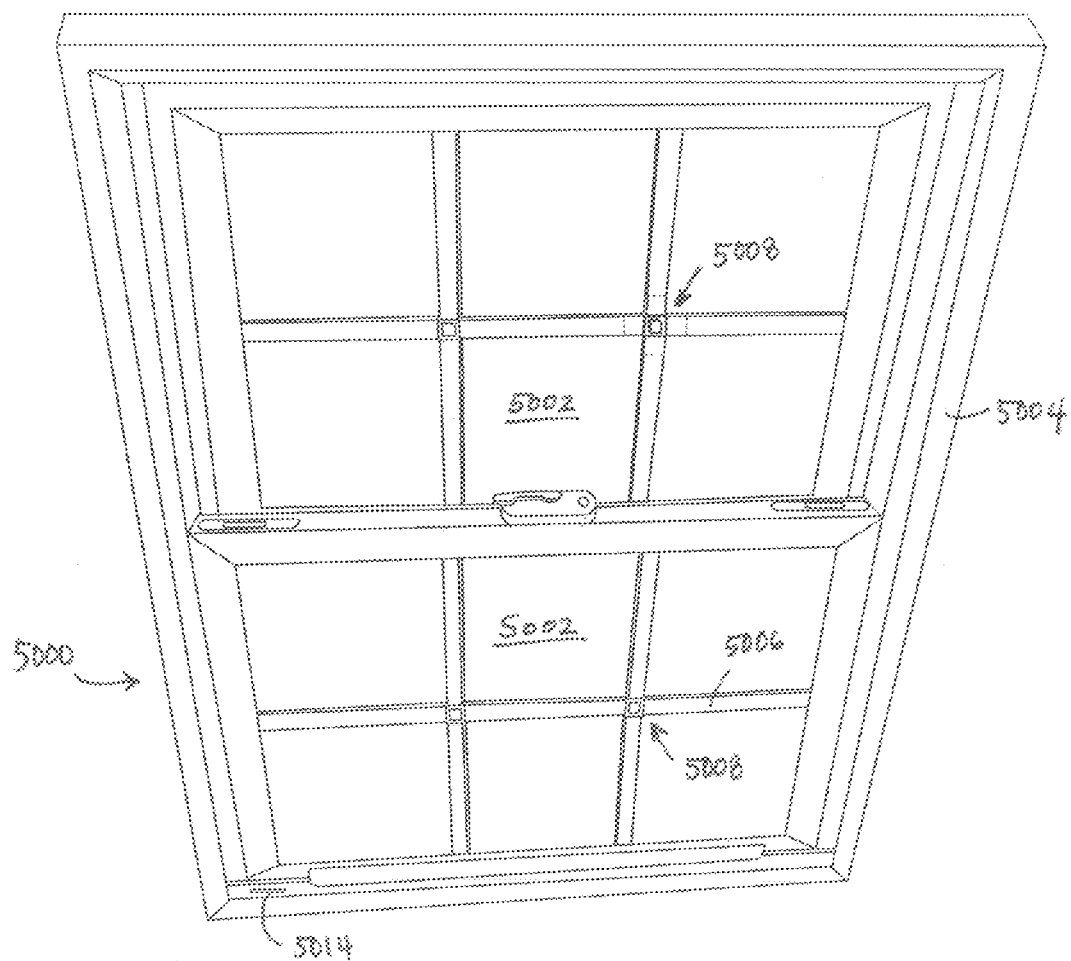
FIG. 34 is a perspective view of a window monitoring system incorporating various insert devices according to one embodiment of the invention.
Figure 35:
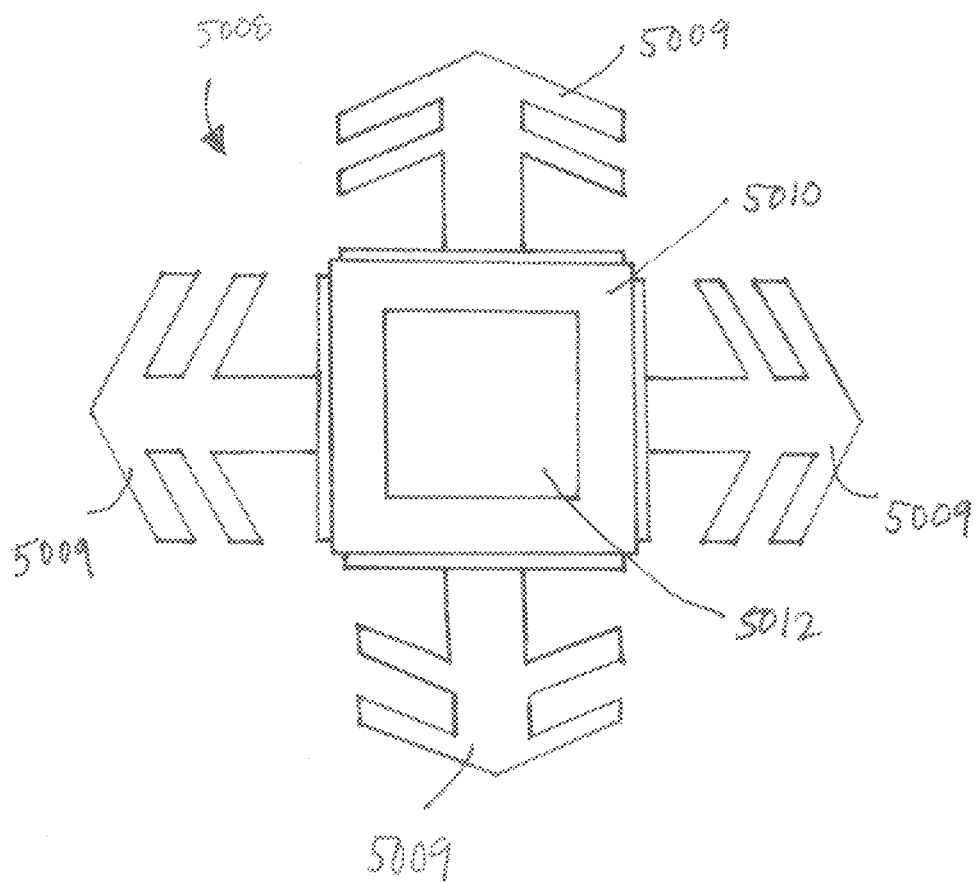
FIG. 35 is a close up perspective view of an insert device according to the invention of FIG. 34.
Figure 36:
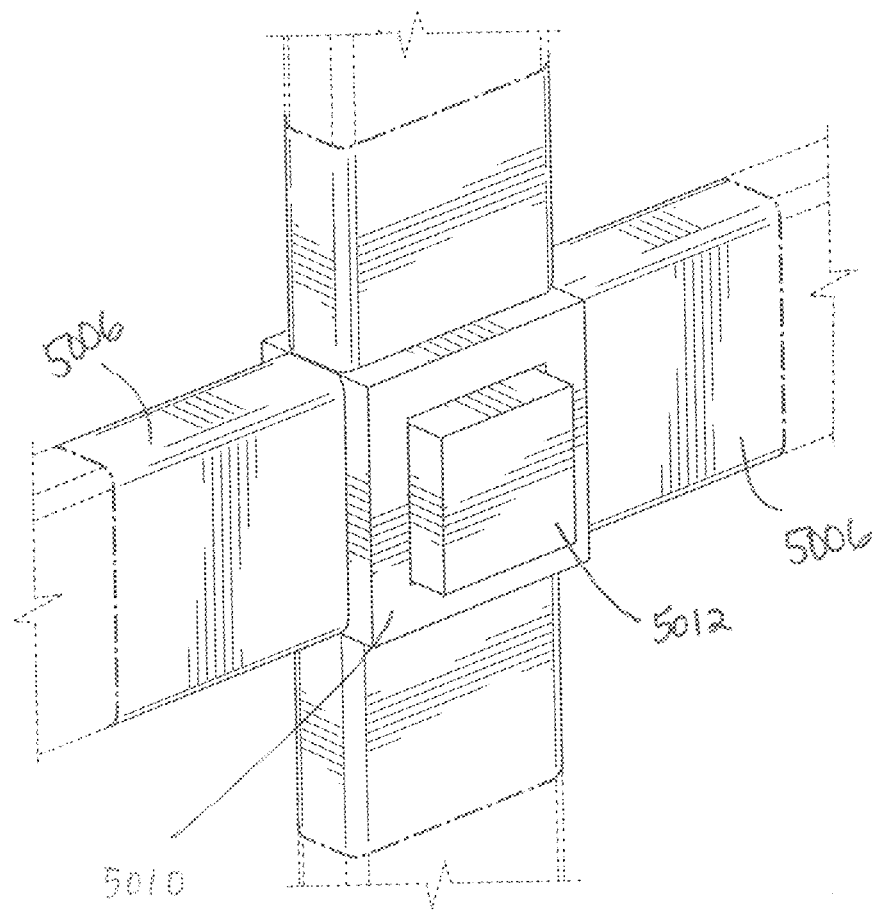
FIG. 36 is a close up perspective view of the window monitoring system of FIG. 34.

In one embodiment of the present invention, vertical and horizontal muntin bars 5006 may be attached at intersects via inserts 5008 (e.g., as shown in FIG. 34). The insert 5008, shown in a close-up in FIG. 35, may include four legs 5009 extending from a central portion 5010 and an insert device 5012. Each leg 5009 may be received by an end of a muntin bar 5006 so as to connect the muntin bars 5006 together, as shown generally in FIG. 36. To keep the insert 5008 in place, the legs 5009 may be configured to fit snugly within the respective muntin bars 5006. The desired design of the muntin bars 5006 between the window panes 5002 may include several intersections. Accordingly, an insert 5008 may be provided at each intersect (e.g., see FIG. 34).

Figure 37:
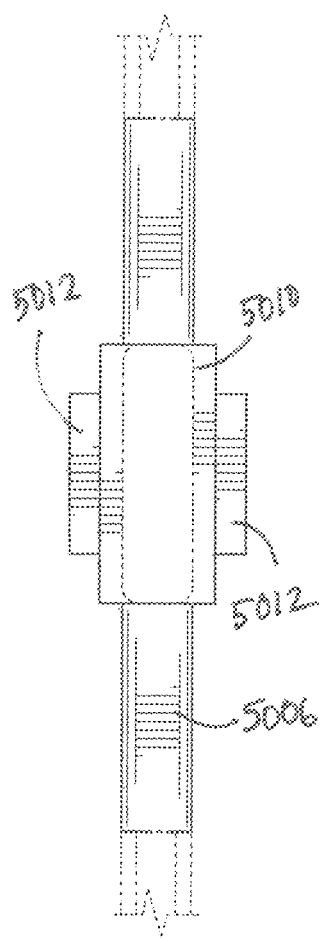
FIG. 37 is a side view of the window monitoring system of FIG. 34.
Figure 38:
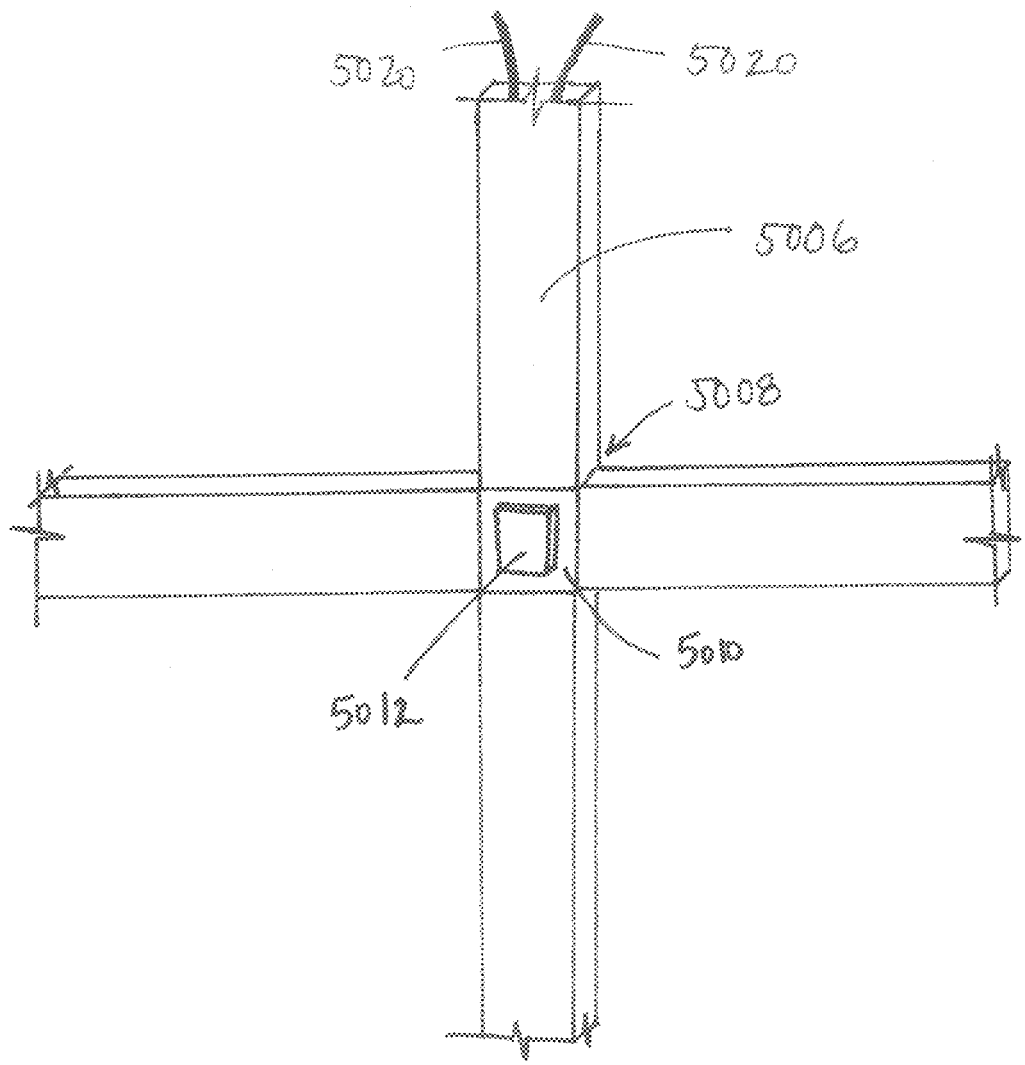
FIG. 38 is a perspective view of the window monitoring system of FIG. 34 showing wires incorporated into muntin bars.

The insert device 5012 may take various forms. As mentioned above, each pattern of muntin bars 5006 may require multiple inserts 5008, and it may therefore be understood that more than one form of insert devices 5012 described below may be incorporated into the system 5000. In one form, the insert devices 5012 may include various apparatus (e.g., 100, 200, 300, 400, et cetera) for dispersing impact forces as described above. Preferable apparatus for dispersing impact forces may be substantially similar to embodiments 600 and 700. As is generally shown in FIG. 37, the apparatus 600 for dispersing impact forces may be situated such that contact members (e.g., 630) abut both window panes 5002. The apparatus 600 may function to disperse impact forces as described above. The apparatus 600 may additionally incorporate sensors 2000, as described above.

In another form, the insert devices 5012 may include various other types of sensors which may be incorporated into one or more inserts 5010. Sensors may be configured to sense movement in or around the window area (e.g., motion sensors), or forces acting upon the window (e.g., contact sensors). Other types of sensors may additionally, or alternately, be incorporated into the system 5000. For example, force sensors may be incorporated into the system 5000 which may be capable of detecting an earthquake well in advance of modern earthquake monitoring systems. Temperature sensors may be able to determine one or both of the temperature of the air outside and the temperature of the air inside the building. As described below, the temperature probe may be electrically connected to the building's comfort system such that the temperature of the building is controlled based on the probe's determination of the temperature outside. The sensor may also be a photocell sensor, for example, which may be configured to operate in conjunction with other devices, such as indoor or outdoor lights, etc.

In still another form, the insert device 5012 may be a recording device such as a camera or video recorder for recording various happenings around the window. The recording device may be programmable so as to continuously monitor the area around the window. Or, the recording device may take pictures or video at predetermined time intervals. Additionally, or alternately, the recording device may be activated, for example, by a movement sensor which may cause the camera to begin taking pictures, or the video recorder to begin taking video.

In one embodiment, the insert device 5012 may optionally include lights, for example, LED lights. The lights may be incorporated into the insert device 5012 in addition to, for example, the sensors or recording devices. In this way, the sensors may act to activate the lights when the sensors are activated, or the light may be activated before the recording device begins recording. Alternately, lights may be individually incorporated into the insert device 5012.

Each of the sensors, camera, recording device, et cetera may require power to operate. Accordingly, the window may be equipped with means for providing power to the various types of insert devices 5012. For example, power may be supplied through hard-wiring means, wherein wires 5020 may be provided between the insert device 5012 and a low-voltage power source in a wall near the window (for example, the doorbell). The wires 5020 may be concealed in the muntin bars 5006, thus allowing the wires 5020 to run from the device 5012 to the power source without being seen. Alternately, the wires 5020 may provide electricity through solar panels attached to or around the window, or from batteries stored in or around the window. In still another alternative, the insert devices 5012 may themselves be solar powered, battery operated, powered by wi-fi, et cetera, as the technology is or becomes available.

In order to provide advanced monitoring, the window may be equipped with the necessary means for storing information from the various insert devices 5012. For example, the window may be configured to receive and operate, for example, an SD card which may hold the information from the various insert devices 5012. The SD card may be removable to allow a user to download information from the SD card and re-insert the card to continue recording information, as is known in the art. FIG. 3 shows a slot 5014 which may be configured to receive the memory device.

As described above regarding FIGS. 24-33 with respect to the sensors 1000, 2000, the various insert devices 5012 may each be equipped with the ability to communicate information over a network. In this way, information received, e.g., from the earthquake sensor, may be transmitted to a monitoring device which may be useful in alerting others to an impending earthquake.

While the muntins 5006 have heretofore been described as being placed between two panes 5002 of windows, it shall be recognized by those of skill in the art that muntin bars 5006 may also be attached to the outside of the window. For example, the muntins 5006 incorporating various inserts 5008 may be configured to fit between the frame of the window for post-production window enhancement. In this way, the system 5000 may be incorporated into existing windows, thus allowing building owners to monitor happenings within the window.

Figure 39:
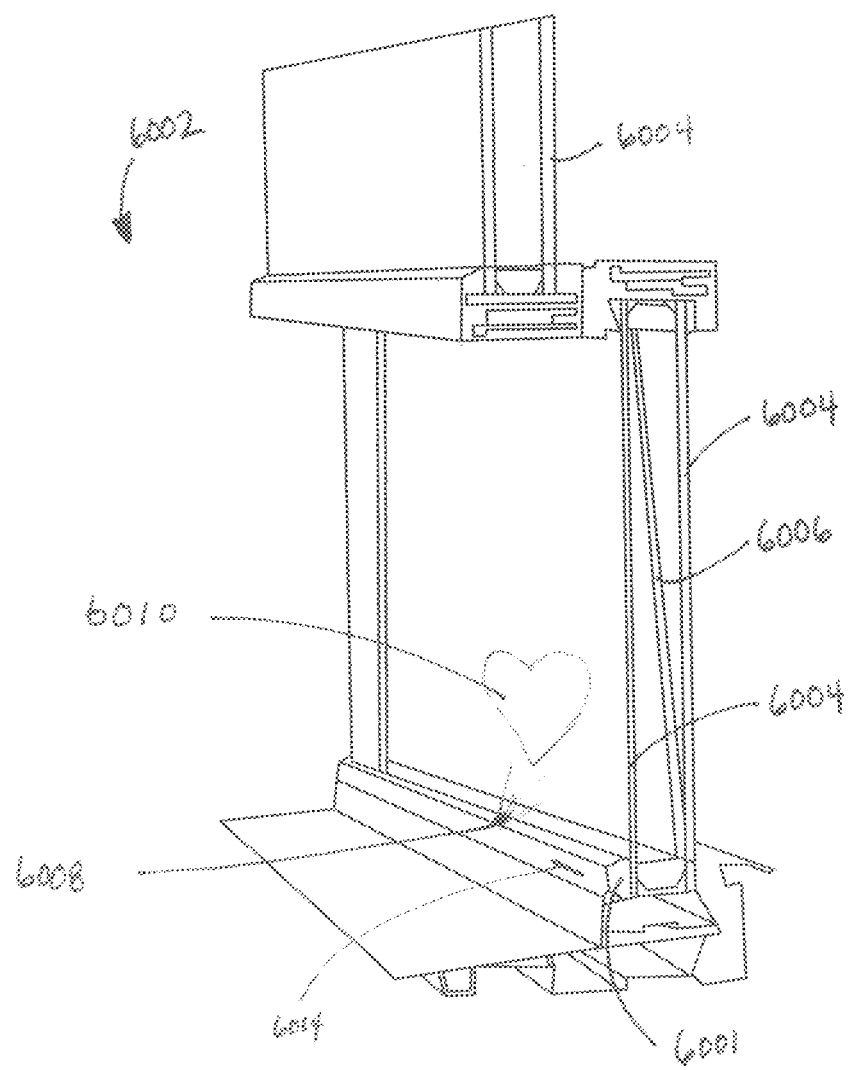
FIG. 39 is a perspective view of a window system incorporating a plate for projecting images according to another embodiment of the invention.

In another embodiment 6000 of a window system, a window 6002 may be equipped with means for displaying various projected images. An angled projecting panel 6006 may be fitted between the panes 6004 of the window, for example as shown in FIG. 39. The panel 6006 may be, for example, a glass pane inserted at an angle sufficient to allow an image to be projected thereon. Alternately, the panel may be plastic, plexiglass, metal, or another similar material. In still another alternative, the panel may be, for example, a retractable screen which may be constructed of vinyl or another similar material.

A memory device (such as an SD card, for example) may be provided with images stored thereon. The memory device may be received by the window frame 6001, for example at slot 6014. The memory device may be removable in order to change the images (e.g., Thanksgiving images, Christmas images, etc).

A projector 6008 may be provided within the window frame 6001 itself and have the capability to project the image 6010 (e.g., an LED image) from the memory device onto the plate 6006. Alternately, the projector may be separate from the window and may project the image onto the plate 6006. The projected image 6010 may be visible through the window panes 6004. The window 6002 may be equipped with the necessary means for providing power to the projector 6008 and for transmitting the image 6010 from the memory device to the projector 6008. The projector 6008 may be hardwired to a power source near the window, or the projector 6008 may be battery powered, solar powered, wi-fi powered, et cetera. The memory device may be hardwired to the projector 6008. Alternately, the memory device may be configured to transmit the image over a network to the projector 6008.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. Various steps in described methods may be undertaken simultaneously or in other orders than specifically provided.

I claim:

1. A window unit, comprising:
a first pane spatially separated from a second pane, the first and second panes being surrounded by a window frame;
a plurality of muntin bars situated between the first and second panes, each muntin bar having a receiving end;
a memory device housed in the window unit for storing electronic data; and
a first insert having first and second legs extending therefrom, the first insert having a first insert device having a data communication feature, the data communication feature being in data communication with the memory device;
wherein the first leg of the insert is received into the receiving end of a first one of the muntin bars and the second leg of the insert is received into the receiving end of a second one of the muntin bars, thereby attaching the first and second muntin bars.

2. The window unit of claim 1, wherein the first insert device includes at least one item selected from the group consisting of a recording device and a sensor.

3. The window unit of claim 2, wherein wires connect the first insert device to a power source, the wires being concealed within at least one of the muntin bars.

4. The window unit of claim 3, wherein the power source is one of: a low-voltage power supply, solar power, battery power, and Wi-Fi power.

5. The window unit of claim 4, further comprising a second insert having at least one leg attaching the second insert to one of the muntin bars, the second insert comprising an apparatus for dispersing impact forces.

6. The window unit of claim 1, wherein the first insert device is selected from the group consisting of:
a) a camera;
b) a video recording device;
c) a motion sensor;
d) a temperature sensor;
e) an earthquake sensor;
f) a contact sensor; and
g) a photo-cell sensor.

7. The window unit of claim 1, further comprising a second insert having at least one leg attaching the second insert to one of the muntin bars, the second insert comprising an apparatus for dispersing impact forces.

8. A window unit, comprising:
a first transparent pane spatially separated from a second transparent pane, the first and second transparent panes being surrounded by a border; and
a memory device for storing electronic data, the electronic data including image data;

an angled panel situated between the first transparent pane and the second transparent pane; and a projector in data communication with the memory device;

wherein the image data is accessed by the projector, the image data being subsequently projected onto the angled panel.

9. The window unit of claim 8, wherein the memory device is removable.

10. The window unit of 8, wherein the border is a window frame and the projector is provided within the window frame.

11. The window unit of claim 8, wherein the border is a window frame and the projector is located separate from the window frame.

12. The window unit of claim 8, wherein the projector is positioned to project the image data through the first pane before the projected image data reaches the angled panel.

13. The window unit of claim 8, wherein the memory device is hardwired to the projector.

14. The window unit of claim 8, wherein the first pane is substantially parallel to the second pane.

15. The window unit of claim 8, wherein the first pane is substantially planar and the second pane is substantially planar.

16. The window unit of claim 8, wherein the border is a window frame of a single-hung window or a double-hung window.

17. The window unit of claim 8, wherein the angled panel is constructed of a material selected from the group consisting of: plastic, plexiglass, metal, and vinyl.

* * * * *